Sept. 27, 1938.                K. N. OGLE                2,131,232
                        CORRECTING BINOCULAR VISION
                  Filed March 6, 1936         11 Sheets-Sheet 1

Inventor
Kenneth N. Ogle
by Roberts, Cushman & Woodberg
att'ys.

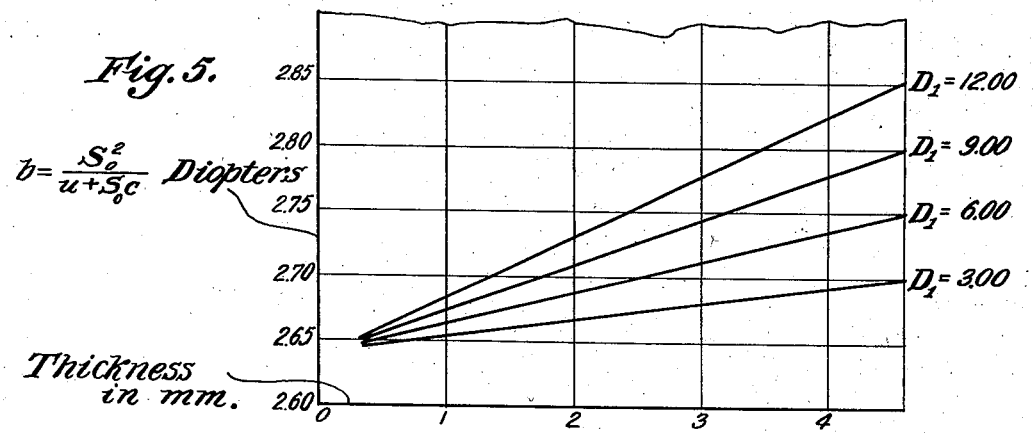
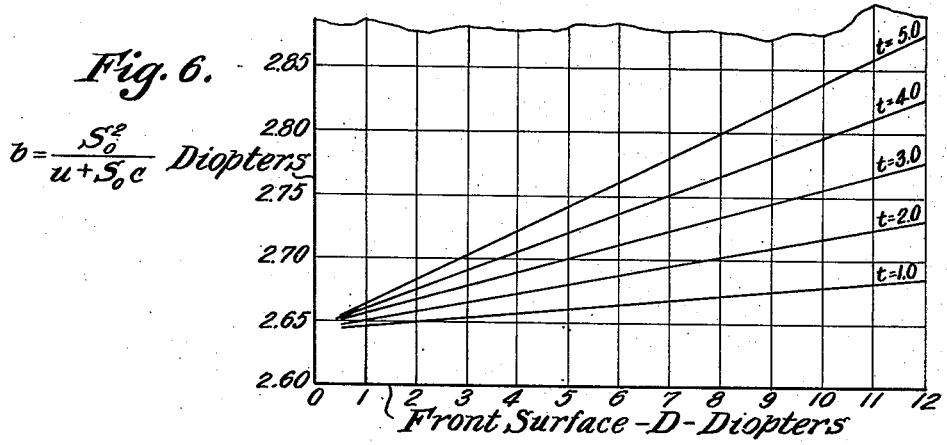
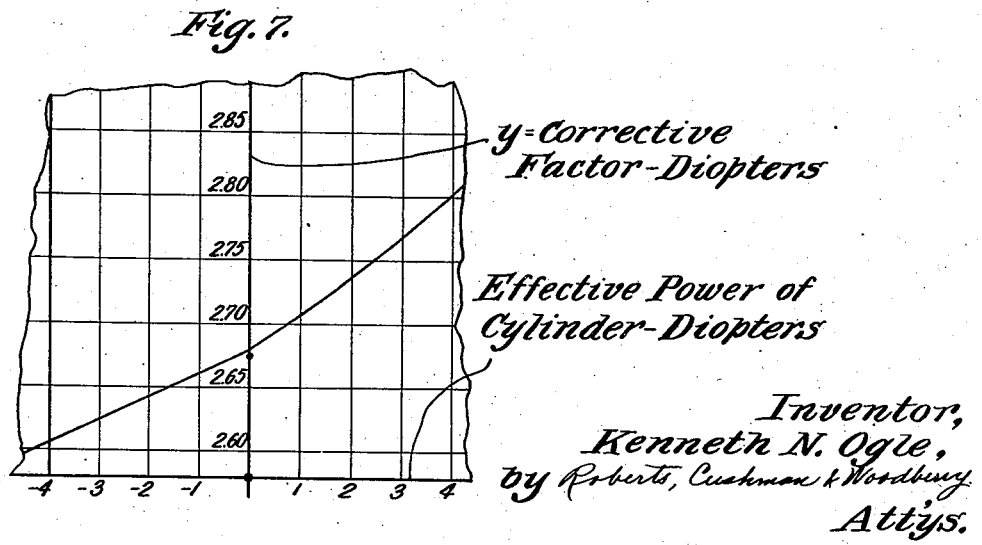

Sept. 27, 1938.    K. N. OGLE    2,131,232
CORRECTING BINOCULAR VISION
Filed March 6, 1936    11 Sheets-Sheet 3

Allowance "g" for the Power of Near Vision Lenses

| Front Surface- Diopters | Lens thickness at Center -mm | | | | |
|---|---|---|---|---|---|
| | 1 | 2 | 3 | 4 | 5 |
| 3 | 2 | 1 | 1 | 0 | 0 |
| 4 | 3 | 2 | 2 | 1 | 0 |
| 5 | 4 | 3 | 3 | 2 | 1 |
| 6 | 4 | 4 | 4 | 4 | 4 |
| 7 | 4 | 4 | 5 | 6 | 7 |
| 8 | 5 | 6 | 7 | 8 | 9 |
| 9 | 5 | 8 | 9 | 12 | 14 |
| 10 | 7 | 9 | 12 | 15 | 17 |

Inventor,
Kenneth N. Ogle,
by Roberts, Cushman & Woodbury.
Attys.

Power Correction Factor for Lens Displacement Near Vision

| Vertex Power Diopts. $V_0$ | Displacement of Lens $\Delta h$ mm | | | | | | |
|---|---|---|---|---|---|---|---|
| | Toward Eye | | | | Away from Eye | | |
| | -3.0 | -2.0 | -1.0 | 0 | +1.0 | +2.0 | +3.0 |
| +8 | +0.065 | +0.045 | +0.020 | 0 | -0.020 | -0.045 | -0.065 |
| +4 | -0.015 | -0.010 | -0.005 | 0 | +0.005 | +0.010 | +0.015 |
| -4 | +0.110 | +0.074 | +0.040 | 0 | -0.040 | -0.074 | -0.110 |
| -8 | +0.320 | +0.211 | +0.106 | 0 | -0.106 | -0.211 | -0.320 |

Inventor,
Kenneth N. Ogle,
by Roberts, Cushman & Woodbury
Attys.

Sept. 27, 1938.  K. N. OGLE  2,131,232
CORRECTING BINOCULAR VISION
Filed March 6, 1936   11 Sheets—Sheet 5

Spurious Magnification for Distant Vision $n_s = n_e$

Spurious Magnification for Near Vision $n_s = n_e$

"t" = Thickness of Lens in mm

Front Surface Powers — $D_1$ — Diopters
"n" as of 1.5232

Inventor,
Kenneth N. Ogle,
by Roberts, Cushman & Woodbury
Attys.

Sept. 27, 1938.  K. N. OGLE  2,131,232
CORRECTING BINOCULAR VISION
Filed March 6, 1936  11 Sheets-Sheet 6

Inventor,
Kenneth N. Ogle,
by Roberts, Cushman & Woodbury
Atty's.

Sept. 27, 1938.  K. N. OGLE  2,131,232
CORRECTING BINOCULAR VISION
Filed March 6, 1936   11 Sheets-Sheet 7

Near Vision

| ZERO POWER FIT OVER CYLINDERS ($n=1.530$) | | | |
|---|---|---|---|
| MAGNIFICATION $S_o$ | OCULAR SURFACE $D$ | THICKNESS MM | FRONT SURFACE $D$ |
| 1.0050 | −4.50 | 1.48 | 4.49 |
| 1.0100 | −10.50 | 1.38 | 10.43 |
| 1.0150 | −10.50 | 2.07 | 10.39 |
| 1.0200 | −10.50 | 2.74 | 10.36 |
| 1.0250 | −11.00 | 3.29 | 10.82 |
| 1.0300 | −14.00 | 3.16 | 13.68 |
| 1.0350 | −14.00 | 3.66 | 13.64 |
| 1.0400 | −14.00 | 4.20 | 13.58 |

Inventor,
Kenneth N. Ogle,
by Roberts, Cushman & Woodbury
Attys.

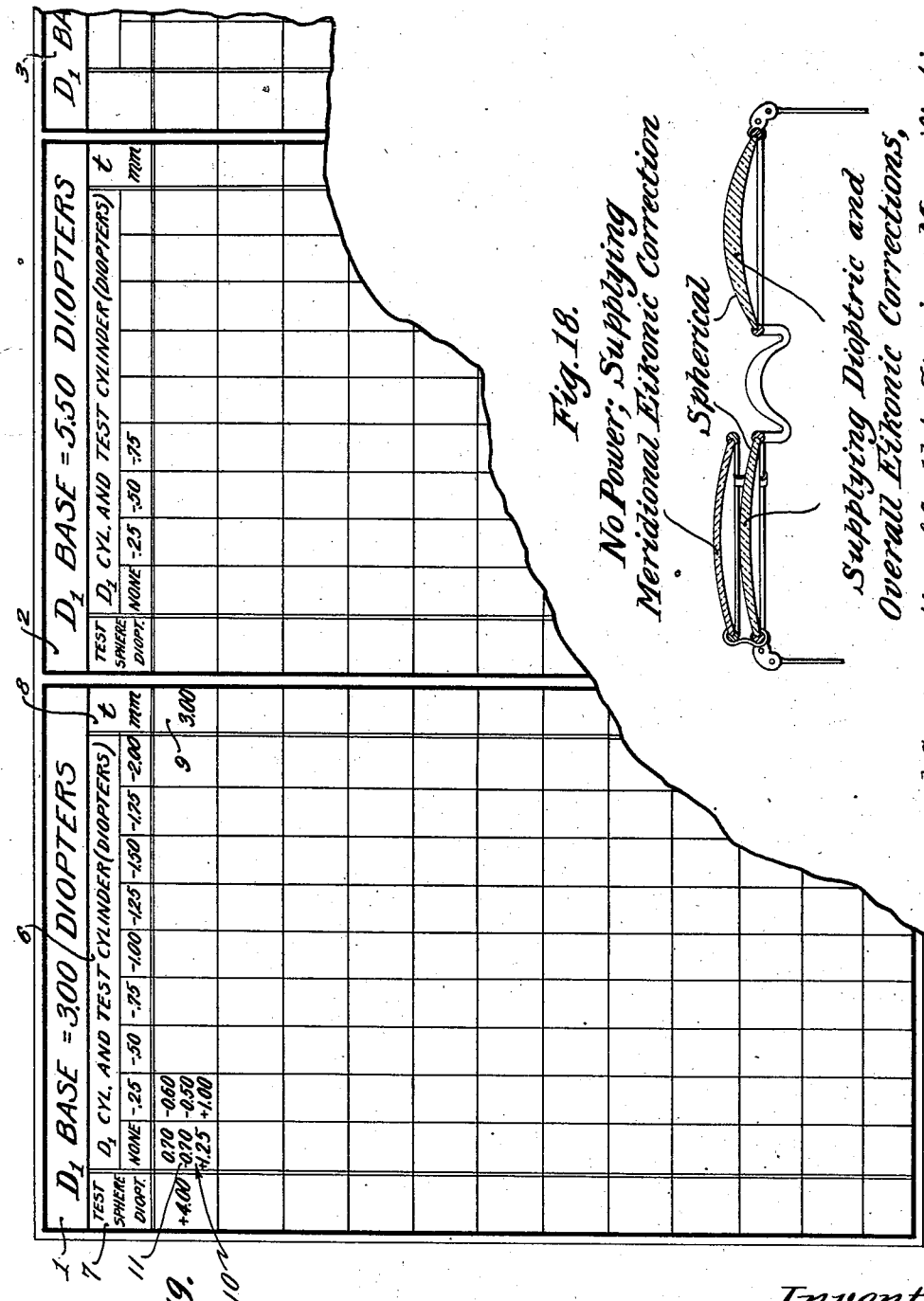
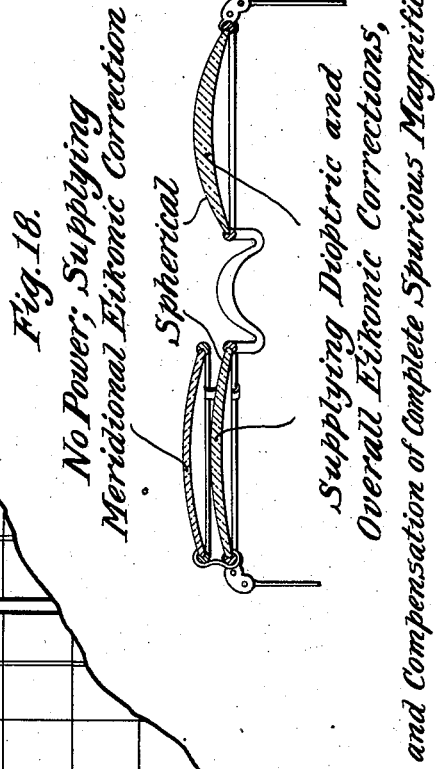
Fig. 18.
Fig. 19.

Sept. 27, 1938.   K. N. OGLE   2,131,232
CORRECTING BINOCULAR VISION
Filed March 6, 1936   11 Sheets-Sheet 9

*Fig. 20.*

No Power; Supplying Meridional Eikonic Correction and Compensation for Spurious Meridional Magnification of Trial Set.

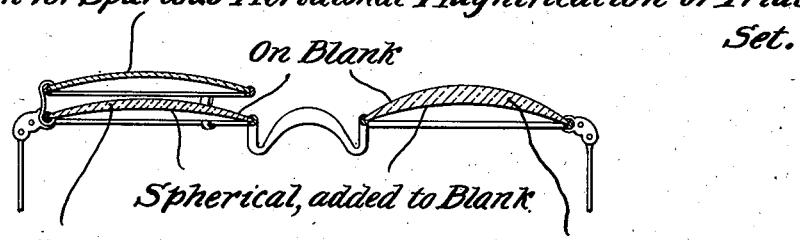

Supplying Dioptric Correction, Overall Eikonic Correction and Overall Compensation for Trial Set Magnification.

*Fig. 21.*

No Power; Supplying Meridional Eikonic Correction.

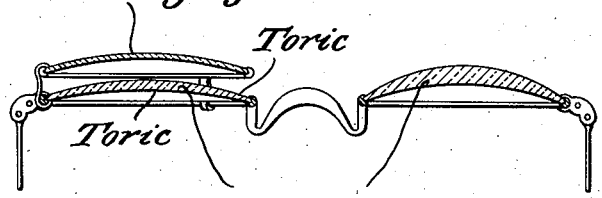

Supplying Dioptric Correction, Overall Eikonic Correction, and Complete Compensation for Trial Set Magnification

*Fig. 23.*

No Power; Supplying Overall and Meridional Eikonic Correction, and Magnification Compensation for Trial and Ocular Spectacle Lenses.

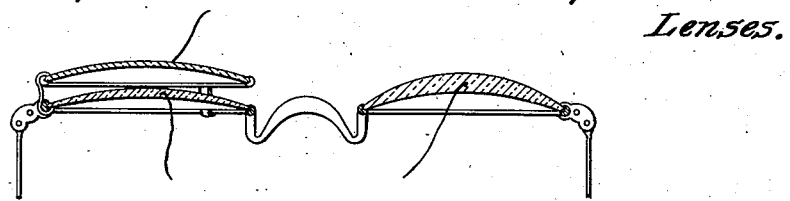

Standard Ophthalmological Lenses Supplying Dioptric Correction.

Inventor,
Kenneth N. Ogle,
by Roberts, Cushman & Woodbury,
Attys.

Sept. 27, 1938.   K. N. OGLE   2,131,232
CORRECTING BINOCULAR VISION
Filed March 6, 1936   11 Sheets-Sheet 10

Fig. 25.

+1.50 D SPHERICAL TRIAL LENS

| $D_1$ / $t$ | POWER OF CYLINDER TRIAL LENS DETERMINING S AND $D_2$ | | | | |
|---|---|---|---|---|---|
| | 0.00 | -0.50 | -1.00 | -1.50 | -2.00 |
| 3.02 / 1.26 | 0.00 / -1.50 | 0.26 / -2.00 | 0.52 / -2.50 | 0.75 / -3.00 | 0.99 / -3.50 |
| 5.49 / 1.80 | 0.50 / -4.00 | 0.73 / -4.50 | 0.96 / -5.00 | 1.15 / -5.50 | 1.36 / -6.00 |
| 7.43 / 2.17 | 1.00 / -6.00 | 1.19 / -6.50 | 1.40 / -5.00 | 1.57 / -7.50 | 1.75 / -8.00 |
| 8.88 / 2.58 | 1.50 / -7.50 | 1.68 / -8.00 | 1.40 / -7.00 | 2.03 / -9.00 | 2.19 / -9.50 |
| 9.82 / 3.03 | 2.00 / -8.50 | 2.17 / -9.00 | 1.88 / -8.50 | 2.50 / -10.00 | 2.65 / -10.50 |

Fig. 26.

$V_o = +1.50$ SPHERE

| $D_1$ / $t$ | POWER OF CYLINDER TRIAL LENS DETERMINING S AND $D_2$ | | | | |
|---|---|---|---|---|---|
| | 0.00 / 1.50 | -0.50 / 1.00 | -1.00 / 0.50 | -1.50 / 0.00 | -2.00 / -0.50 |
| 2.96 / 1.27 | 0.00 / -1.46 | 0.26 / -1.96 | 0.52 / -2.46 | 0.75 / -2.96 | 0.99 / -3.46 |
| 5.38 / 1.81 | 0.50 / -3.91 | 0.73 / -4.41 | 0.96 / -4.91 | 1.15 / -5.41 | 1.36 / -5.91 |
| 7.34 / 2.17 | 1.00 / -5.92 | 1.19 / -6.42 | 1.40 / -6.92 | 1.57 / -7.42 | 1.75 / -7.92 |
| 8.87 / 2.58 | 1.50 / -7.41 | 1.68 / -7.91 | 1.88 / -8.41 | 2.03 / -8.91 | 2.19 / -9.41 |
| 9.71 / 3.03 | 2.00 / -8.40 | 2.17 / -8.90 | 2.35 / -9.40 | 2.50 / -9.90 | 2.65 / -10.40 |

Fig. 22. Bi-Toric Fit-Overs.   Ocular Surface 3-Base.

| M in Toric Curve Meridian | | Magnification in Base Curve Meridian | | |
|---|---|---|---|---|
| | | 0.50 % / t = 2.26 mm. | 0.75 % / t = 3.38 mm. | 1.00 % / t = 4.33 mm. |
| 0.50 % | $D_2$ / $D_1$ | -2.83 / Plano | | |
| 1.00 % | $D_2$ / $D_1$ | -6.017 / +3.25 | -3.95 / +1.12 | |
| 1.50 % | $D_2$ / $D_1$ | -9.29 / +6.50 | -6.32 / +3.50 | -4.52 / +1.75 |
| 2.00 % | $D_2$ / $D_1$ | | -8.55 / +5.75 | -6.32 / +3.50 |
| 2.50 % | $D_2$ / $D_1$ | | -10.76 / +8.00 | -8.06 / +5.25 |
| 3.00 % | $D_2$ / $D_1$ | | | -9.78 / +7.00 |

Ocular Surface in Base-Curve Meridian -2.83 D

Inventor,
Kenneth N. Ogle,
by Roberts, Cushman & Woodbury
Atty's.

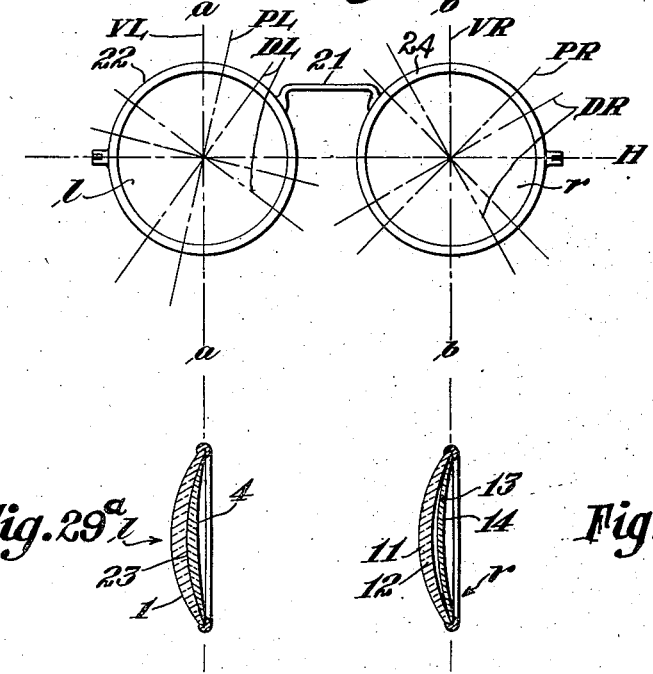

Patented Sept. 27, 1938

2,131,232

UNITED STATES PATENT OFFICE

2,131,232

CORRECTING BINOCULAR VISION

Kenneth N. Ogle, Hanover, N. H., assignor to Trustees of Dartmouth College, Hanover, N. H., a corporation of New Hampshire Application March 6, 1936, Serial No. 67,557

22 Claims. (Cl. 88—20)

According to a recent contribution to the science of physiological optics, the eyes are subject not only to dioptric or muscular defects (ametropia, phoria) or both, but also to defects due to incongruity of the ocular images, which term describes the impression formed in the higher brain centers through the vision of one eye. It is determined not only by the properties of the dioptric image that is formed on the retina of the eye but also by the modifications imposed upon it by the anatomical properties and physiological processes by which this optical image is carried to the higher brain centers.

It was found that binocular vision,—and with it in many cases the general well being,—of individuals afflicted with incongruity of their ocular images is very much impaired, and methods and apparatus for examining such patients are for example described in Letters Patent No. 1,944,871, of January 30, 1934, to Adelbert Ames, Jr. and Gordon H. Gliddon, and copending applications Serial Nos. 618,200 and 706,523, filed June 20, 1932 and January 13, 1934, respectively.

Eyeglasses for correcting such defects (which will herein be referred to for short as "size" or "eikonic" defects), either alone or in connection with the conventional dioptric or muscular errors, also called "iseikonic" spectacles, are described in Letters Patent No. 1,933,578, of November 7, 1933, to Adelbert Ames, Jr.

The present invention has the main object of correcting binocular vision according to an improved method, and of providing correcting spectacles designed in accordance with that method, especially with a view to the application thereto of various practical problems presented by peculiarities of ocular defects, tests, and desired correction which render difficult the exact duplication of the test correction with the corrective spectacles.

In one more specific aspect, my invention deals with providing spectacles for correcting dioptric and size or eikonic ocular defects which are equivalent to certain test lens means whereby optical properties of these test lenses insofar as they differ from those of the equivalent spectacle lenses, are considered in the computation of the latter.

Another feature of my invention is the taking into account of differing object distances in the computation of spectacle lenses equivalent to trial lenses used during tests at such distances, as for example infinite or relaxed and reading distances.

Still another feature of the invention is the provision of simple yet exact computation methods and appliances correlated with certain test and lens making procedures, for providing spectacles of the type referred to.

According to the present invention, it is possible to provide spectacles with so-called "fit over" lenses of zero vergence power effecting the entire, or part of the size correction, and also spectacles incorporating both dioptric and size corrections in lens elements of unitary design.

These and other objects, aspects and features of my invention will be apparent from the following detailed explanation illustrating its genus with reference to several concrete embodiments and examples thereof.

The description refers to drawings in which.

Figs. 5 to 17, 19, 22, and 24 to 28 are examples of graphical charts and tabulations used for purposes of my invention;

Figs. 18, 20, 21, and 23 are schematical representations of fit over lenses according to my invention; and Figs. 29, 29a and 29b are a front elevation, and two sections on lines $a$—$a$ and $b$—$b$ of that elevation, respectively, of a spectacle for correcting ocular defects with oblique principal and eikonic meridians.

Test conditions

Figure 1:
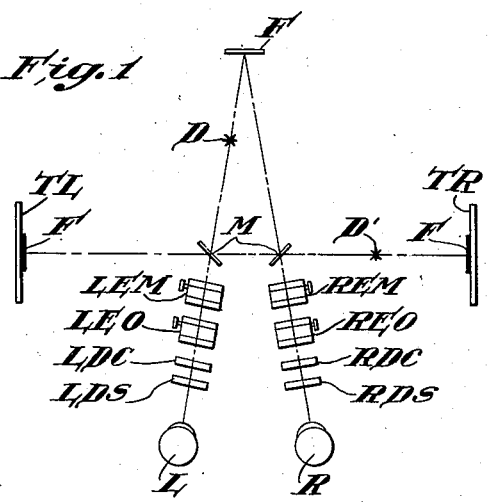
Fig. 1 is a diagrammatic representation of an example of an ocular test providing a trial correction to which spectacles according to my invention are substantially equivalent.
Figure 2:
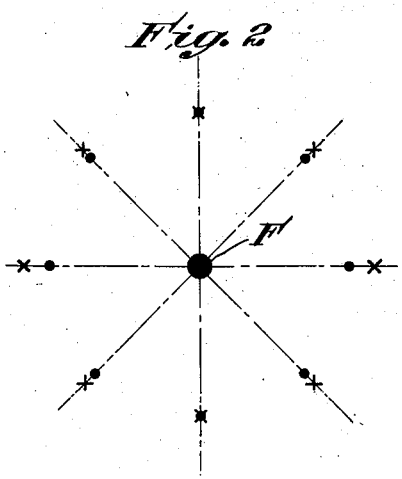
Fig. 2 is a schematic representation of a test for evaluating ocular image size defects.

Shortly recapitulating the disclosures of the above-mentioned Patent No. 1,944,811 and copending applications Serial Nos. 618,200 and 706,523, and by referring to Fig. 1 schematically illustrating one of the various possible test procedures, the patient's eyes are positioned at R and L and fuse in binocular vision a fixation object or fixation objects F. The dioptric conditions during binocular vision can then be measured, for example with an adjustable focusing object D or D' placed in the line of vision of each eye, whereas the relation of the ocular images is determined for example with the aid of eikonic targets TL and TR having thereon test objects which are symmetrically distributed with respect to the fixation means, but whose respective ocular images can be differentiated for comparison thereof. The test objects are brought into the field of vision by suitable means, for example reflectors M. If the ocular images are unequal, using for example a fixation object F in the center of unlike test objects TL and TR for the left and right eye, respectively, and assuming that the patient has an ocular image size difference in the horizontal meridian, the test targets will appear to him as indicated in Fig. 2, where the dots may represent dark points of target TL, and the crosses bright points of target TR.

The dioptric defects are corrected and measured with the aid of dioptric trial lens sets, Fig. 1 indicating at LDS, LDC, RDS, and RDC spherical and cylindrical trial lenses, respectively, for the left and right eyes, respectively, the spherical lenses, indicated by letter S, being next to the eyes, and the cylinder lenses (for correcting astigmatism) indicated by letter C, being in front thereof.

The ocular image size or eikonic defects remaining after correcting the dioptric defects may be due to the above discussed inherent ocular image incongruity and in addition, if the dioptric defects of the eyes differ, to the dioptric correction since the latter, in addition to its vergence power effect has also an image magnification effect. These eikonic defects are corrected and measured with eikonic or size measuring trial lenses, preferably continuously adjustable magnifying lens systems according to my copending application Serial No. 713,701, filed March 2, 1934. They are provided for overall as well as meridional magnification and indicated at LEO, LEM and REO, REM of Fig. 1, the letters O and M indicating "overall" and "meridional" respectively.

In this connection, it should be noted that the meridians of astigmatism, or principal meridians, are, generally speaking, for each eye different from the meridians of meridional size differences or eikonic meridians.

*Relation between ocular defects, test corrected and spectacles*

The optical relations under the above-discussed circumstances, between ocular defects, test lens means and equivalent spectacles, upon which relations my invention is based, will now be explained.

Figure 3:
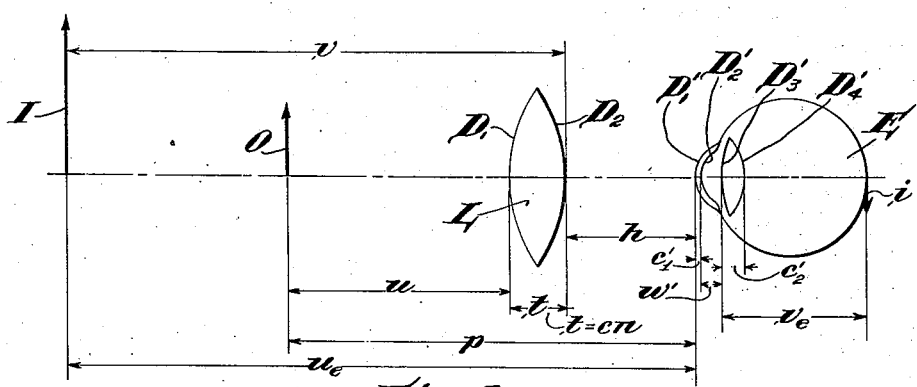
Figs. 3 and 4 are diagrammatic views illustrating the method of designing spectacles according to the present invention.

*Single lens system.*—The case will first be discussed where a single lens L (Fig. 3) is placed before an ametropic eye E. It is assumed that the eye should be fully corrected, namely that the dioptric image on the retina is sharply formed. Gauss' Paraxial Ray Theory (compare for example J. G. Leatham, "The Symmetrical Optical System", Cambridge, 1908) shows that in any optical system the conjugate distances $u$ and $v$ of an object O and its image I, respectively, from the first and last surfaces (for example $D_1$ and $D_2$, respectively, of Fig. 3) of the optical system, are defined by the relation $$Auv + Bv - Cu - D = 0 \quad (1)$$

where $u$ and $v$ are reduced distances, that is actual distances divided by the index of refraction of the respective medium, and where A, B, C, D are the so-called Gauss coefficients which can, for example, be evaluated from the following matrix (see for example, Transactions of the Optical Society, 1928, vol. 29, page 170):

$$\begin{vmatrix} B & D \\ A & C \end{vmatrix} = \begin{vmatrix} 1 & 0 \\ D_1 & 1 \end{vmatrix} \begin{vmatrix} 1 & c_1 \\ 0 & 1 \end{vmatrix} \begin{vmatrix} 1 & 0 \\ D_2 & 1 \end{vmatrix} \cdots \begin{vmatrix} 1 & 0 \\ D_n & 1 \end{vmatrix} \quad (2)$$

In this matrix, $D_1, D_2 \ldots D_n$ are the surface powers, and $c_1, c_2 \ldots c_{n-1}$ the reduced separations between the respective surfaces.

If $D'_1, D'_2, D'_3$ and $D'_4$ are the dioptric powers of the four refractive surfaces of the eye E; $c'_1$, W' and $c'_3$ the reduced thicknesses of cornea, anterior chamber and crystalline lens, respectively; $u_e$ the distance of the object (in this case image I of lens L) from $D_1$; and A', B', C', D' the respective Gauss coefficients, the reduced distance $v_e$ of the image $i$ on the retina, from surface $D_4$ is $$v_e = \frac{C' u_e + D'}{A' u_e + B'} \quad (3)$$

The relation between the size of image $i$ on the retina and the size of the effective object (here I) is then $$m_e = \frac{i}{I} = \frac{1}{A' u_e + B'} \quad (4)$$

where $m_e$ is the magnification of the dioptric system of the eye.

Introducing now the single correcting lens L, with reduced thickness $$c = \frac{t}{n}$$

the image distance $v$ is $$v = \frac{C_u + D}{A_u + B} \quad (5)$$

The magnification effected by lens L is then $$m_L = \frac{I}{O} = \frac{i}{A_u + B} \quad (6)$$

Substituting the explicit values of the Gauss coefficients and introducing $$F_1 = D_1 + \frac{1}{p + h - t}$$

$F_1$ being the vergence with which the incident rays leave surface $D_1$, image distance $v$ is $$v = \frac{1 + F_1 c}{F_1 + D_2(1 + F_1 c)} \quad (7)$$

The vergence power V of lens L for distance $u$ is then $$V = \frac{I}{v} = \frac{F_1}{1 + F_1 c} + D_2 = SF_1 + D_2 \quad (8)$$

if $$S = \frac{1}{1 + F_1 c}$$

Similarly, the lens magnification of (6) becomes $$\left. \begin{array}{c} m_L = S \dfrac{U}{V} \\ \\ U = \dfrac{1}{u} \end{array} \right\} \quad (9)$$

where

The ratio of the linear sizes in any given meridian, of image $i$ on the retina and of object O can now be found by multiplying Equations (4) and (9):

$$\frac{i}{O} = m_L m_e = S \frac{U}{V} \frac{1}{A' u_e + B'}$$

Image $i$ being assumed to be sharp, the following relation exists:

$$U_e = v + h = \frac{1 + Vh}{V}$$

By eliminating $u_e$ with the aid of (3) and by multiplying with, and dividing through $p$, the image-object relation can be transformed into $$\frac{i}{O} = \frac{1}{1-D_1c} \frac{P}{u + \frac{c}{1-D_1c}} \frac{1}{1-Vh} \frac{D'-B'v_e}{p}$$

or $$\frac{i}{O} = ME$$

where $$M = S_o LP$$
$$E = \frac{D'-B'v_e}{p}$$
$$S_o = \frac{1}{1-D_1c}$$
$$L = \frac{p}{u+S_oc}$$
$$P = \frac{1}{1-Vh}$$
$$V = V_o - \frac{S_o^2}{u+S_oc}$$
$$V_o = S_oD_1 + D_2$$

$$(10)$$

In this fundamental relation, the magnification $M$ is a function of the corrective lens only, and $E$ is a function of the dioptric constants of the eye. $S_o$ will be called "shape factor", $L$ "distance factor", and $P$ "power factor". $V$ is the vergence power of lens $L$, for the finite object distance $u$, and $V_o$ is the vertex power (often called back focal length) of lens $L$. For a very large $p$, vergence and vertex power become identical.

Figure 4:
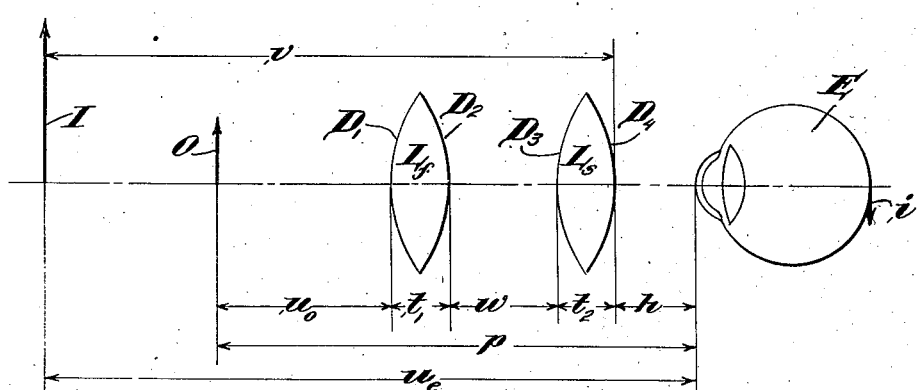

Since the dioptric trial lens elements and in certain instances also the spectacles consist of two lens elements, it becomes necessary to consider the conditions for such systems, as follows:

*Two element lens system.*—Referring now to Fig. 4, $D_1$, $D_2$, $D_3$, $D_4$ are the four surfaces of the two lens elements $L_f$ and $L_s$; $c_1$ and $c_2$ respectively are the reduced thicknesses of the respective lens elements; and $w$ is the air separation. Equations (5) and (6) hold true for this case, if the coefficients $A$, $B$, $C$, $D$ are evaluated for four surfaces according to matrix (2) and relations corresponding to Formulas (8) and (9) can be written as follows:

By introducing subscripts $f$ and $s$ for the first and second lens, respectively, the total vergence power $V_t$ of the system shown in Fig. 4 becomes:

$$V_t = V_{os} + \frac{V_f S_{os}^2}{1 + V_f(w + S_{os}c_2)}$$

where $$V_{os} = S_{os}D_3 + D_4$$
$$V_f = S_f(D_1 + U) + D_2$$
$$S_{os} = \frac{1}{1+D_3c_2}$$
$$S_f = \frac{1}{1+(D_1+U)c_1}, \quad U = \frac{1}{u}$$

$$(11)$$

In this relation, $V_{os}$ is the vertex power of the second lens, and $V_f$ the vergence power the first lens for the object distance $u_o$ (see Fig. 4) from $D_1$.

Similarly, the magnification of the system can be derived as $$m_L = S_f S_{os} T \frac{U}{V_t}$$

where $$T = \frac{1}{1 + V_f(w + S_{os}c_2)}$$

$$(12)$$

If the two element lens system is used to correct the eye in a given meridian, the ratio of the sizes of image $i$ on the retina and of object $O$ can be found,—in analogy to relation (10) for the single element lens system,—as $$\frac{i}{O} = ME$$

where $$M = S_{of}S_{os}TLP$$
$$E = \frac{D'-B'v_e}{p}$$
$$S_{of} = \frac{1}{1-D_1c_1}$$
$$S_{os} = \frac{1}{1-D_3c_2}$$
$$T = \frac{1}{1-V_f(w+S_{os}c_2)}$$
$$L = \frac{p}{u+S_{of}c_1}$$
$$P = \frac{1}{1-V_th}$$
$$V_f = S_f(D_1-U) + D_2$$
$$S_f = \frac{S_{of}u}{u+S_{of}c_1}$$
$$V_f = V_{of} - \frac{S_{of}^2}{u+S_{of}c_1}$$
$$V_{of} = S_{of}D_1 + D_2$$
$$V_{os} = S_{os}D_3 + D_4$$

$$(13)$$

Since $T$ is defined by separation $w$ of the two lens elements, it may be referred to as "separation factor".

It will be understood that in this case $$u_e = p - h - t_1 - t_2 - w,$$

as shown in Fig. 4. All other values occurring in this relation have been previously explained.

*Relation between aniseikonia and size of image on retina.*—Since the correction of ocular image incongruities or aniseikonia is necessarily based on the relation of the respective ocular images of binocularly viewed objects, the relation between the sizes of the dioptric images on the retinas and the corresponding ocular images must be considered, and then the relation between the sizes of the ocular images of the two eyes.

The ocular image is a subjective phenomenon, its absolute size can not be measured nor otherwise determined. However, it can be written as $i' = ki$, where $i'$ is the size of the ocular image, $i$ the size of the corresponding retinal image, and $k$ a factor of proportionality, which can be supposed to be substantially constant for a pair of eyes under certain conditions of binocular vision. Hence, if the sizes of the ocular images of a certain object are $i'_1$ and $i'_2$, and the corresponding images on the retina $i_1$ and $i_2$, the ratio of the ocular image sizes is $$\frac{i'_1}{i'_2} = a\frac{i_1}{i_2}$$

where $a = k_1/k_2$, the ratio of the relations between the sizes of an image on the retina and its corresponding ocular image. It will be evident from the above explanation of the nature of ocular images and of aniseikonia, that $a$ may be different from unity even if the images on the retina are congruous. For purposes of the present discussion, it is assumed that $a$ is constant for paraxial rays and for any given position of the eyes.

From relation (13) it follows that $i_1 = M_1 E_1 O$ and by using subscripts 1 and 2 to distinguish values for the respective eyes, $i_2 = M_2 E_2 O$, so that the ratio $R_o$ of the ocular image sizes is $$R_o = \frac{i_1''}{i_2''} = \frac{M_1}{M_2} ad \quad (14)$$

if the ration of $E_1$ to $E_2$ is called $d$, a function of the dioptric characteristics of the respective eyes.

The ratio $R_o$, herein referred to as "eikonic ratio", can be measured as discussed above with reference to Figs. 1 and 2.

It will be evident that the magnitudes of $M_1$ and $M_2$ and hence their ratio will vary depending upon the selection of a pair of reference points from which objects and image differences are measured. Always, however, the ratio of image size to object size, $i/O = ME$ is constant, assuming sharp imagery, that is substantially corrected ametropia.

Hence, it should be kept in mind that, although the ratio $R_o$ (14) is exact and real, the ratio $M_1/M_2$ of the magnifications of test lenses or corrective spectacle lenses alone has no absolute physical meaning as far as aniseikonia is concerned.

*Relation between test and spectacle lenses in the correction of aniseikonia.*—When the patient is tested as described with reference to Fig. 1, the eikonic ratio $R_o$ in any given meridian is measured by modifying the ratio of magnifications of the test lenses until the ocular images appear equal. Relation (14) leads to $$\frac{i_1''}{i_2''} = R \left[ \frac{M_1}{M_2} \right]_e da = 1 \quad (15)$$

where $R$ is the ratio of the magnifications of the size test lenses, and $R = 1/R_o$. The subscript $e$ indicates that magnifications $M_1$ and $M_2$ are effected by test lenses.

Generally speaking, and excepting cases of aphakia, $R$ differs from unity only by a few per cent. Therefore, it was found convenient to express this ratio as $R = 1 + e$ and to refer to $100e$ as per cent eikonic or size difference. For example, if the dimension of one image is assumed to be 1.00, and that of the other 1.02, the eikonic difference would be 2%.

Equation (14) describes the ocular image size ratio for any kind of lenses used with the eyes, and hence also the condition when spectacles are used.

If the spectacle lenses are selected to provide for the respective eyes magnifications $M_1$ and $M_2$, the ocular images will be equal if $$\frac{i_1''}{i_2''} = \left[ \frac{M_1}{M_2} \right]_s da = 1 \quad (16)$$

where subscript $s$ refers to spectacle lenses.

Equation (16) states the condition under which the ocular image sizes in the respective meridian are equal. It must be substantially satisfied in all meridians.

Equations (15) and (16) must be identical, and therefore $$\left[ \frac{M_1}{M_2} \right]_s = R \left[ \frac{M_1}{M_2} \right]_e \quad (17)$$

This relation, called "iseikonic condition", gives the necessary relation of the magnifications of equivalent test and spectacle lenses.

Similarly, the vergence powers of test and spectacle lenses must be equal, namely $$\left. \begin{array}{l} [V_1]_s = [V_1]_e \\ [V_2]_s = [V_2]_e \end{array} \right\} \quad (18)$$

Equations (17) and (18) state the necessary conditions for the design of the lenses of spectacles equivalent in any specified meridian to the particular test correction.

*The equivalent spectacle*

*Power.*—As indicated in Fig. 1, the dioptric trial lenses used for correcting the patient's ametropia consist of spherical lenses for correcting spherical ametropia and of cylindrical lenses for determining amount and axes of astigmatism. Generally speaking, both spherical and cylindrical power lenses will be needed before each eye, the spherical lens being usually placed directly in front of the eye.

It is convenient to have the trial lenses so marked that the total effective vergence power of any test lens combination can be found by merely adding to the power of any sphere the effective power marked on any cylinder.

As relation (11) shows, the powers of cylinders and spheres can be made additive if the marked power $V_f'$ of the cylinder is $$V_f' = \frac{V_{of} S_{os}^2}{1 - V_{of}(w + S_{os} c_2)} \quad (19)$$

For distant vision, the powers can then be added as follows:

$$V_{ot} = V_{sf}' + V_{os} \quad (20)$$

It will be understood that, in accordance with Fig. 4, subscripts $f$ indicate cylinder lenses, subscripts $s$ spherical lenses, and subscripts $o$ vertex powers. Relation (19) signifies that, if additive relation (20) is to be fulfilled, $V_f'$ can be a function only of the vertex power $V_{of}$ of the cylinder. Hence, values $S_{os}$ and $c_2$ must remain constant for all spherical lenses, or in other words, the front surface powers and thicknesses must be the same for all spheres.

The additive property expressed by Formula (20) is actually found in several of the trial case sets manufactured and extensively used today. Their cylinder lenses are marked with values $V'_{of}$ and, provided that $w$ is always the same, the powers of spheres and cylinders add up to the total power of the trial system, but exactly correct only for infinite object distance.

Clinical examinations are usually made at two visual distances, one of 6 m. which is practically infinite, and one at 40 cm. The same trial lenses are used for correcting ametropia at both distances, the amount of ametropia at near distance being expressed in vertex powers $V_{os}$ and $V_{of}$. Actually, the vergence power at near distance is considerably less, and can be determined for any one single lens by subtracting the values of true vertex power $V_o$—relation (10)—and vergence power $V$ for finite distance—equation (8). This operation gives the relation $$\left. \begin{array}{l} \text{where} \quad V = V_o - b \\ b = \dfrac{S_o^2}{u + S_o c} \end{array} \right\} \quad (21)$$

In this relation, the value $b$ is a function only of shape factor, object distance and lens thickness. Values of $b$ for various front surface powers and lens thicknesses are given graphically in Figs. 5 and 6.

In the case of the above-mentioned standard trial lenses, the front surface powers and thicknesses of the spheres are constant for the entire set, the correspondingly constant value of $b$ being 2.676 for the near vision test distance of 400 mm. from the mean nodal point of the eye to the test object. Hence, if only a spherical trial lens is used, its vergence effect can be accurately obtained by means of correction $b$.

If the trial cylinder lenses are also used, as will very often be the case, the $b$ factor must be corrected by a factor $r$ depending on the power of the cylinder. With sufficient accuracy, the formula for $V_t$ of relation (11) can be written $$V_t = V_{oa} + V_{of} - y$$
where approximately
$$y = b + r \qquad (22)$$

Fig. 7 gives the values of $y$ for cylinder diopters from $-4$ to $+4$, to be used when both cylinders and spheres are used. If cylinders alone are used, the values of $r$ alone, as given in Fig. 8, have to be taken into consideration.

Recapitulating, the effective power $V$ of trial lenses at a given object distance will be $$V = V_o - b \text{ if only spheres are used,}$$
$$V = V_o - r \text{ if only cylinders are used,}$$
and
$$V = V_o - y = V_o - (b + r) \text{ if both cylinders and spheres are used.} \qquad (23)$$

The specifications for the spectacle lens which has the same vergence as the trial lens set can now be found as follows:

First, a spectacle lens having the same vergence power as the trial case sphere for near vision will be considered.

The vergence powers of test lenses and spectacle lenses are according to (21):

$$[V]_e = [V_o]_e - b_e$$
$$[V]_s = [V_o]_s - b_s$$

According to relation (18) these vergences must be equal:

$$[V_o]_s = [V_o]_e + b_s - b_e \qquad (24)$$

An allowance table can be used to relate the vertex power $V_o$, the thickness and the two surfaces $D_1$ and $D_2$ of any lens, according to the relation $$V_o = D_1 + D_2 + e$$
where the allowance factor is
$$e = \frac{D_1^2 c}{1 - D_1 c} \qquad (25)$$

Therefore, relation (24) can be written as $$[V_o]_s = D_1 + D_2 + g$$
where
$$g = b_e - b_s + e \qquad (26)$$

Figures 8, 9:
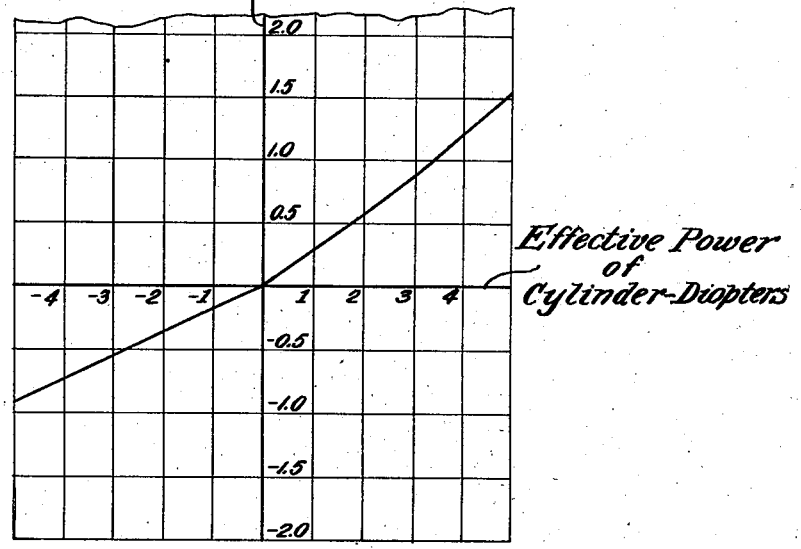

Factors $e$ and $b_s$ depend only upon the front surface powers, and the lens thickness, for a given visual distance. $b_e$ is constant, and hence an allowance table giving $g$ can be prepared. Fig. 9 represents such a chart, giving $g$ for any value of $D_1$ and $t$. Fig. 9 contains only $g$ values for even $D_1$ and $t$ values in order not to make it too voluminous for present purposes. For actual use, such a table contains $D_1$ values in 0.25 diopter steps of $D_1$ and 0.2 or 0.1 mm. steps of $t$. The object distance in Fig. 9 is 40 cm.

In the cylinder power meridian, the spectacle lens with a power equivalent to power $V_t$ due to both sphere and cylinder,—compare (22)—, has the power $$[V_t]_e = D_1 + D_2 + g + r \qquad (27)$$

For the above discussed customary trial sets, factor $r$ is of the magnitude of a few thousandths, and can therefore be neglected.

In the axis meridian of the cylinder there is likewise a correction which is a constant if, as usual, the faces are plano and all cylinders have the same thickness. It can be easily taken into account, preferably by inclusion in charted values as herein used.

Although they could be moved to varying positions relatively to the eyes, the ocular surfaces of the test lenses are usually placed, for practical reasons, at a fixed distance therefrom. The ocular surfaces of the spectacle lenses, however, will in general not have the position of the corresponding trial case surfaces. The condition of equivalency of the vergence powers of trial and spectacle lenses refers specifically to identical points before the eyes, namely the positions of the ocular trial lens surfaces. Hence, if the spectacle lenses depart from that position, their powers must be altered if the eyes are to be fully corrected. In general, the change is small and can be taken care of by adding a correction factor, as follows.

Since $V$, the vergence power, is the reciprocal of the distance of the image of the lens from the ocular surface, if the lens is moved away from the eye by a small distance $\Delta h$ meters, the change in vergence power to keep the eye corrected becomes $$V = -V^2(\Delta h)$$

and the change in vertex power is approximately $$V_o = -\left[V_o^2 - \frac{2V_o S_0^2}{u + S_o c}\right](\Delta h)$$

For distant vision, this reduces to $$V_o' = -V_0^2(\Delta h)$$

Thus, the new vergence power, for which the equivalent spectacle lens is to be designed becomes $$V' = V[1 - V(\Delta h)] \qquad (28)$$

and for distant vision $$V_0' = V_0[1 - V_o(\Delta h)] \qquad (29)$$

Figures 10, 13:
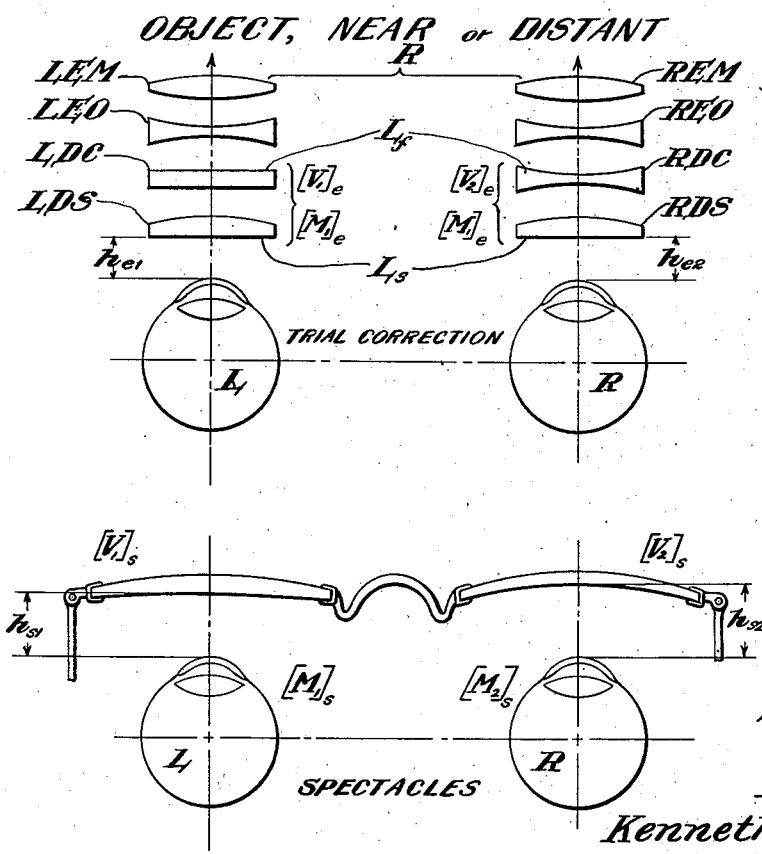

According to this relation, in order to maintain the eye fully corrected if a converging lens is moved away ($\Delta h$) mm. from the position for which its correct power was obtained, its power must be decreased. For negative lenses, the power must be (negatively) increased. A table, as for example shown in Fig. 10, is useful for applying this correction. The table of Fig. 10 shows selected values for near vision, but it will be understood that a similar table can be designed for distant vision, and for intermediate values. The table is otherwise self-explanatory.

*Magnification.*—It will be remembered that for any given meridian, the iseikonic condition (17) must be fulfilled. In this condition, ratio $[M_1/M_2]_s$ refers to the spectacles, $R$ is the measured eikonic correction ratio, and $[M_1/M_2]_e$ refers to the ratio of the magnifications of the dioptric trial case lenses. The latter consist, generally speaking, of both sphere and cylinder, and therefore $M_1$ and $M_2$ of the trial lenses are magnifications according to relation (13), namely:

$$M = S_{of} S_{os} TLP \qquad (13A)$$

In this, and the following relations, subscript $f$ refers to cylinders, and $s$ to spheres, in accordance with Fig. 4.

The iseikonic condition can then be written $$\left[\frac{(S_o LP)_1}{(S_o LP)_2}\right]_s = R\left[\frac{(S_{os}S_{of}TLP)_1}{(S_{os}S_{of}TLP)_2}\right]_e \quad (30)$$

It will now be evident that the true magnification ratio for the spectacle lenses is not R, and can not be found before the magnification ratio of the dioptric trial lenses is determined from the M relation of each trial case set. Only if the ratio of the magnifications of the dioptric trial case lenses could be made unity would R actually indicate a true aniseikonic condition and have a more exact clinical significance.

As pointed out when discussing the conditions of vergence equivalency, the distance $h_e$ from cornea to ocular surface of the trial lens set is generally different from the corresponding distance $h_s$ of the spectacle. These distances are related by $h_s = h_e + \Delta h$.

If the P factor of relation (13) is differentiated with respect to $h$, remembering that V is also a function of $h$, the result is for small increments of change in $h$ $$\Delta P = PV(\Delta h)$$

and hence $$P_s = P_e + \Delta P = P_e[1 + V(\Delta h)]$$

By defining $$P' = 1 + V(\Delta h), \quad (31)$$

the $P_s$ value becomes $$P_s = P_e P' \quad (32)$$

By dividing relation (30) through by $[P_1/P_2]_e$, and by assuming that, as is commonly the case, the dioptric trial case in use has equal thicknesses $t_2$ of all spheres, equal front surface ($D_3$ of Fig. 1) powers of all spheres, and constant separation $w$ between all spheres and cylinders, this relation (30) can be written $$\left[\frac{(S_o LP')_1}{(S_o LP')_2}\right]_s = \left[\frac{(S_{of}TL)_1}{(S_{of}TL)_2}\right]_e = R\left[\frac{N_1}{N_2}\right]_e$$

where $$S_{of} = \frac{1}{1 - D_1 c_1}$$

$$T = \frac{1}{1 - V_f(w + S_{os}c_s)} \quad (33)$$

$$L = \frac{p}{p - h - t_1 - t_2 - w + S_{of}c_1}$$

The value $N = S_{of}TL$ for any given trial case cylinder lens used in the testing instrument will be designated as "Spurious magnification" or "Cylindrical excess magnification". For positive cylinders it is a positive magnification, while for negative cylinders it is negative, that is a diminution.

The factor $S_{of}$ could be neglected, as cancelling out from Equation (30), if cylinders were always used before both eyes, assuming that a conventional trial set with equal front surface power and lens thicknesses is used. Since, however, this condition is not normally fulfilled, this factor must be taken into consideration.

In the T factor, values $w$, $S_{of}$ and $c_s$ are constants if the conventional trial set is used; hence T varies ordinarily only with the vergence power $V_f$ of the cylinder lens used. For distant vision tests, $V_f$ changes into vertex power $V_{of}$ which is zero in the axis meridian. Hence, the T factor is unity in that axis for distant vision. It is always present in the power meridian of the cylinder trial lens and in the axis meridian when the object distance is finite.

The L factor is effective in the power and axis meridians, unless the test is made for infinite distance, when L is unity. If cylinder lenses are used before both eyes, L is the same for both eyes and cancels out. It will, therefore, be evident that factor L must always be considered in tests for near vision when only one cylinder is used, which is quite frequently the case.

Summing up, the cylinder trial lens in front of the trial sphere introduces, for near vision, a spurious magnification $S_{of}TL$ in the power and axis meridians; for distant vision, a spurious magnification $S_{of}T$ is introduced in the power meridian.

Figure 11:
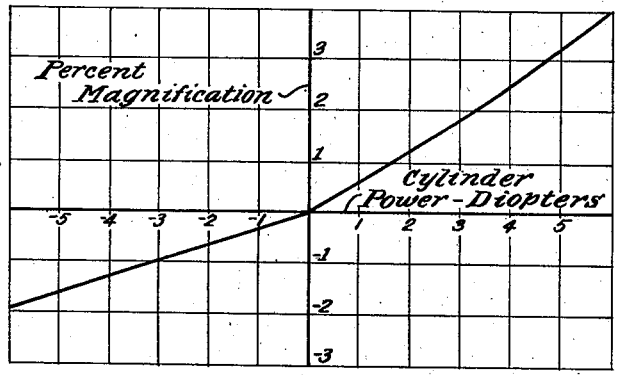

In the case of distant vision and assuming the distance from eye to ocular surface is the same for test and spectacle correction, the correct magnification in the principal meridian (there is in this case no spurious magnification in the axis meridian) can be conveniently obtained with the aid of a diagram as shown in Fig. 11. Since $S_oT$ is of the order of a few per cent, it is convenient to use instead $100(S_o T - 1)\%$, and Fig. 11 is drawn accordingly. It furnishes on the vertical axis the magnification of the trial lens for the powers plotted along the horizontal axis.

Figure 12:
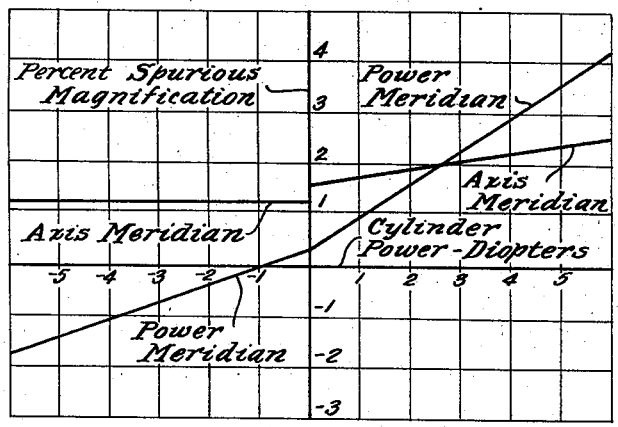

For near vision, the spurious magnification must be taken into account in both meridians, as indicated above. The $S_{of}TL$ values in the principal meridian and the $S_{of}T'L$ in the axis meridian can be charted as shown in Fig. 12, which is otherwise similar to Fig. 11 and needs no further explanation.

It should be noted that factor T' for the axis meridian is different from T for the power meridian and depends on the vergence power of the cylinder which is in this instance, because the image and object planes coincide, $V' = 1/(u_o + t_1)$.

*Selection of spectacle lenses.*—It will now be evident that with the formulas for V in (10), (13), and (21) to (29), the above-described graphical representations for the vergence relations, and Formulas (33) for the magnification relations, spectacle lenses equivalent to a given trial lens correction can be designed for any visual distance, for distances from the eye to the ocular lens surface different for test lenses and spectacles, and by exactly compensating for errors inherent in the generally used above-described dioptric trial lenses.

The practical application of the above-described principles will now be described more in detail and for several more or less exacting actual requirements.

Recapitulating, with reference to Fig. 13 which uses the reference letters and numerals of previous figures, the eyes are tested with dioptric and eikonic test lenses, at certain distances from the eyes, the two ocular surfaces of the dioptric trial case being usually at equal distances $h_e$ from their respective eyes. The true vergence powers $[V_1]_e$ and $[V_2]_e$—relation (18)—are then determined by compensating for inherent deviations as outlined above.

The true magnification ratio of the trial correction is then determined by modifying the magnification ratio R obtained by means of the eikonic trial lenses, with the magnifications of the dioptric trial lenses, by taking into account the spurious magnifications N,—see relation (33).

Having thus determined the $M_s$ values for the respective eyes, a lens surface and a lens thickness, or if lens combinations are used in the spectacles, surfaces and thicknesses are selected which provide these magnifications, and finally the remaining surfaces are obtained which, with the previously selected characteristics, provide the given vergence power necessary for dioptric correction.

The present invention utilizes the basic principle of separating the total magnification of a lens in factors, in a manner permitting convenient prescription and manufacture of lenses having a magnification and power reproducing the given test correction of an eye. The total magnification $M'$ of the lens to be manufactured is separated into two factors $S'$ and $P'$, where $S'$ is due to optical characteristics not affecting vergence power, and $P'$ to dioptric properties.

By preparing lens blanks with front surfaces of certain powers and with certain maximum thicknesses which values define $S'$, it is possible to preselect lenses or blank series with given non-dioptric magnifications $S'$. The ocular side of the lens can then be provided with a surface producing the required vergence power and at the same time producing a $P'$ fulfilling condition $M'=S'P'$. The functions of front and ocular surfaces, respectively, may be interchanged and, accordingly, the surfaces of a complete system may be divided into "magnification" (defining $S'$) and "power" (defining power and $P'$ fulfilling condition $M'=S'P'$) surfaces, respectively.

Spectacles provided with lenses made in accordance with the above prior method are correct only for infinite distances and disregard certain requirements of binocular correction, and discrepancies between trial correction and spectacle correction, which can, in many instances, not be neglected or avoided in actual practice. The present invention provides means for taking these conditions into consideration.

In selecting equivalent spectacle lenses, the relative position of principal and eikonic meridians must be especially considered. For each eye, the principal and measured eikonic meridians do not, generally speaking, coincide, and since the eyes frequently have principal meridians of different inclination, it will now be evident that the meridians of symmetry of the surfaces providing the magnification and the astigmatic correction, respectively, are, generally speaking, inclined to one another.

In order to correct defects of this type, unitary spectacle lenses (or lens units) may be provided which have one toric surface (or set of surfaces) determining a prescribed magnification $M_s$ in a certain eikonic meridian, and a second surface (or set of surfaces) determining a dioptric correction $V_s$ in a meridian, derived from a principal meridian, which may, or may not, be inclined to the eikonic meridian. Such iseikonic spectacles with double toric lenses will be described more in detail hereinafter.

While it is always possible to provide substantially complete correction with unitary lenses, either single lenses or doublets in single eyewires, it is often preferable to select, according to one embodiment of my method of providing size and dioptric correction, spectacle lenses which, for specified object distances and distances of the lenses from the eyes provide dioptric and in most cases overall size correction equivalent to that of the trial lenses, whereas meridional size correction, and sometimes also some overall size correction, is provided with the aid of so-called "fit over" lenses having substantially no power and being mounted in front of one spectacle lens proper, or of both.

Various embodiments of eyeglasses of this fit over type are feasible; herein they will be distinguished by the shape of the surfaces of the ocular lens element. This element can either have a spherical front surface and a toric ocular surface, or a toric front surface and a spherical ocular surface, or two toric surfaces. In many cases, standard lenses of types heretofore used for dioptric correction can be used in combination with no power fit over lenses supplying eikonic correction and compensation.

Spectacles of this type are especially useful for temporary purposes since they are, generally speaking, cheaper than those with unitary lenses or doublets.

The making of practical spectacles according to the above-described methods will now be explained, beginning with fit over lenses.

Iseikonic spectacles with fit over lenses

*Spherical front surface.*—Generally speaking, for selecting the ocular lens element, the $[M_1]_s$ value for one eye is selected arbitrarily, and for the other lens an $[M_2]_s$ is chosen which, with $[M_1]_s$, provides the measured ratio $R$, the $M$ values being in the present instance where fit over lenses are used, as above pointed out, only overall magnifications. Front surface curvatures giving these magnifications must then be found. According to the invention, this is quickly and accurately accomplished with the aid of charts.

Figure 14:
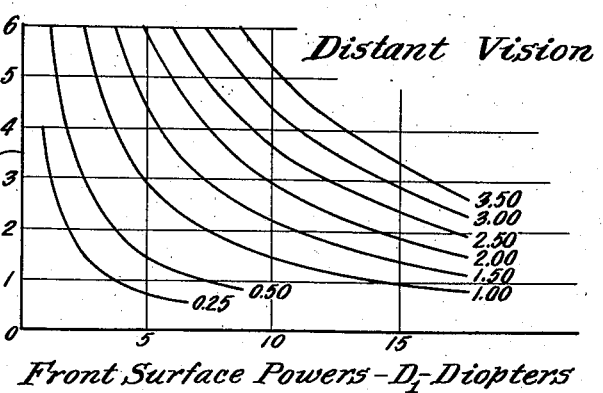

Fig. 14 shows a chart for distant vision directly furnishing, according to relations (34) and (35) below, front surface power $D_1$ and lens thickness $t$ effecting the given magnification $(S-1)\%$.

Figure 15:
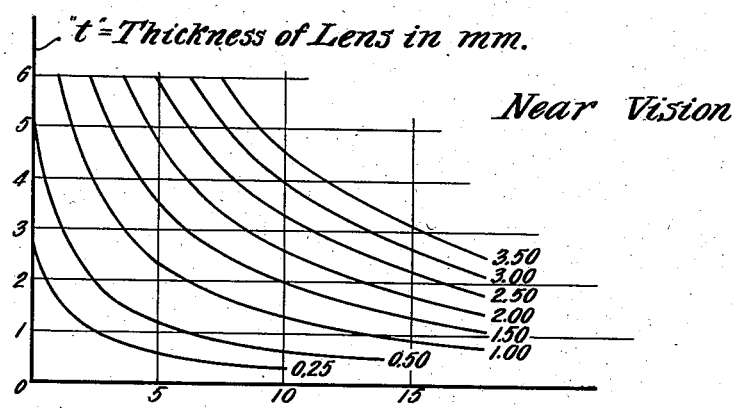

For near vision, a similar chart according to Fig. 15 is used which contains $(SL-1)\%$ values corresponding to relations (36) and (37), below.

In either case, the ocular surfaces $D_2$ are then found which, together with the other lens elements, provide the measured and corrected vergence power $V_0$. For this purpose, tabulations similar to the allowance chart according to Fig. 9 are used to advantage.

These charts are derived from relation (33), for chart Fig. 14 simplified as above discussed for distant vision where $p$ is indefinite, and for both charts assuming that the ocular surfaces of trial and spectacle lenses are at the same distance from the eye, and that a customary trial set, as above discussed, is used.

These simplifications furnish the following relations, which are also the basis of Figs. 11 and 12:

For near vision:

Principal meridian $(m)$ $$\left[\frac{(S_oL)_1}{(S_oL)_2}\right]_s = R_m \left[\frac{(S_{of}TL)_1}{(S_{of}TL)_2}\right]_e \qquad (34)$$

Axis meridian $(x)$ $$\left[\frac{(S_oL)_1}{(S_oL)_2}\right]_s = R_x \left[\frac{(S_{of}L)_1}{(S_{of}L)_2}\right]_e \qquad (35)$$

For distant vision:

Principal meridian $(m)$ $$\left[\frac{S_{o1}}{S_{o2}}\right]_s = R_m \left[\frac{(S_{of}T)_1}{(S_{of}T)_2}\right]_e = \frac{(1-D_1c)_1}{(1-D_1c)_2} \qquad (36)$$

Axis meridian $(x)$ $$\left[\frac{S_{o1}}{S_{o2}}\right]_s = R_x \quad \text{(no correction necessary)} \qquad (37)$$

Figure 16:
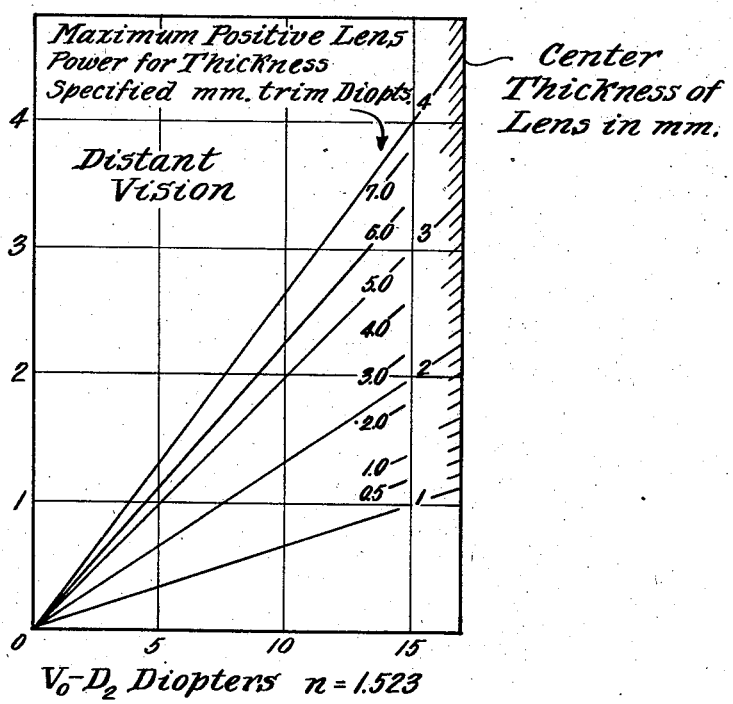
Figures 17, 24:
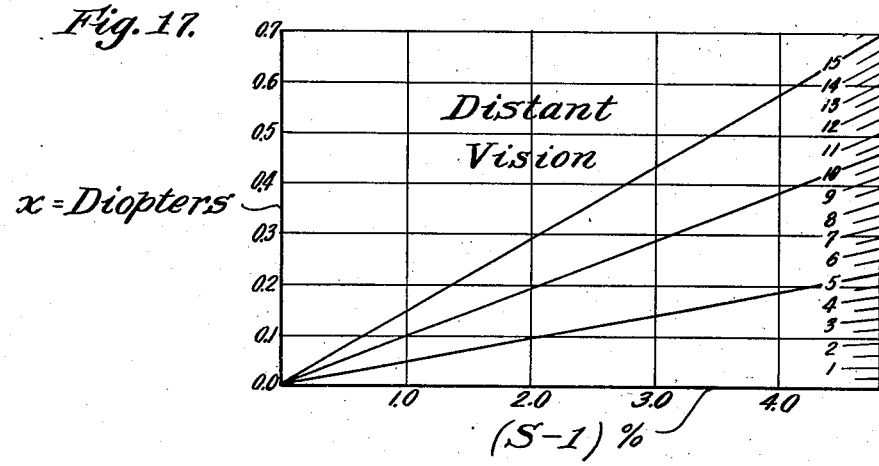

For far vision, another type of correction can be used as follows. This method of computation is advantageous because it permits the selection of toric surfaces which can be ground with conventional stock tools. It consists in first selecting an ocular surface, from which a given magnification $S_o$ for a given front surface $D_1$ and a thickness $t$ is determined. A chart is preferably prepared giving the relation between $S_o$, $t$, and $D_2$ according to the following deduction. For distant vision there is $$\frac{1}{S_o} = 1 - D_1 c$$

$$V_o = S_o D_1 + D_2$$

$$c = \frac{t}{n}$$

from which results by separating $D_1$:

$$\left.\begin{aligned} t &= n\frac{S-1}{V_o - D_2} \\ \text{and} \quad D_1 &= \frac{V_o - D_2}{S} \\ \text{or} \quad D_1 &= V_o - D_2 - x \end{aligned}\right\} \quad (38)$$

if $x$ is a difference member to be subtracted from $V_o - D_2$ for obtaining $D_1$. The charts shown in Figs. 16 and 17 represent relations (38). Fig. 16 gives $V_o - D_2$ values for selected $S_o$ and $t$ values, and Fig. 17, of the nature of an allowance chart, provides convenient selection of the $x$ values to be subtracted from the $V_o - D_2$ data of Fig. 16 in order to obtain $D_1$.

These ocular lenses are then combined with zero power fit over lenses, dimensioned in a manner which will be explained more in detail hereinafter, following the description of the various types of fit over spectacles.

Fig. 18 shows a spectacle of the type now described, with spherical front surface, toric ocular surface, and zero power fit over lenses supplying the meridional eikonic correction.

*Spherical ocular surface.*—As mentioned above, the second type of spectacles with fit over lenses is that with ocular lenses having toric front and spherical ocular surfaces providing complete dioptric and overall size correction, the meridional size correction being again taken care of by no power fit over lenses.

This arrangement permits the use of lens blanks having toric front surfaces, the spherical ocular surfaces being ground according to each individual prescription. This has the advantage that only spherical surfaces have to be added to the blanks in order to provide a given power, the overall magnification and cylindrical power steps being supplied by the toric front surfaces ground at the factory.

In order to facilitate the selection of eyeglasses of this type, I provide charts or tables of which Fig. 19 is an example, and which form, with the method of correcting visual defects for which they are used, part of the present invention.

The table shown in Fig. 19 lists the above-described ocular lens elements with toric (factory made) front surfaces, and spherical ocular surfaces (added when filling the prescription) in the following novel manner:

Separate sections are provided for various base curves ("$D_1$ BASE") of the front surfaces, as indicated in Fig. 19 at 1, 2, and 3. In this instance, only two sections for base curves of +3.00, +5.50 diopters are shown. Actually, more sections will be necessary, and I found it convenient to provide for base curves in the steps Plano, 3.00, 5.50, 6.50, 7.50, 9.00, 11.50, and 12.50, which correspond to the lens blanks known in the art as "Tillyer" series P, Ceritex M, G, A, B, C, E, and F, respectively. It will, however, be understood that other types of lenses could be used.

In each section, the cylinder curves ($D_1$ cyl) of the toric blank surfaces, and the test cylinder values, which approximately agree, are listed as heads of vertical columns at 6. The test sphere values, and the final spectacle lens thicknesses $t$ are listed in vertical columns 7 and 8.

For each cylinder value is listed one $t$ value, for example at 9, and for each combination of test sphere and test cylinder are given, at 10, three figures, the upper figure being the magnification of the spectacle lens in the spherical meridian, the center figure the magnification of the spectacle lens in the cylinder meridian, and the lower figure the $D_2$ value, that is, the curvature of the ocular spherical surface to be added to the blank.

The table of Fig. 19 may, for example, be computed by ray tracing and, in the present instance, is designed not for a constant distance of the ocular lens surface, but for an eyewire distance of 12 mm., for reasons which will be discussed later. In its computation, all differences in optical characteristics caused by the difference of eye to ocular surface distances of test lenses and spectacle lenses, test lens separation, lens thickness, etc., are compensated for as at length discussed hereinbefore.

Hence, all that remains to be done after the examination of the eyes is to select the $D_2$ value of a lens providing the required dioptric correction and the overall magnification found to be indicated during the test by means of the test lenses LEO and REO (Fig. 1), this magnification being the first figure at 10 as above explained, and the $D_2$ value the last figure. The appropriate thickness is taken from columns 8. The meridional size difference composed of the compensation values at 11 in the middle of space 10, and the values measured with the trial lenses at LEM and REM are then corrected with the aid of no power fit over lenses, as above described.

The compensation values 11 are related to the astigmatic meridian, whereas the measured meridional size difference is in the eikonic meridian. Generally speaking, these two meridians do not coincide, so that this method of correction is correctly applicable only if the two meridians do not depart more than about 15°, which was found to be the approximate threshold value for correction of both magnifications in the same meridian. However, a very large number of actually occurring cases comes within this category.

In view of the nature of the commonly used trial lenses these tables have been computed for direct use when only negative spherical lenses are employed in the test, that is, if only plano ocular surfaces are used, which do not introduce a shape factor. For use with different trial sets, the tables could be modified accordingly.

If it is desired to fit spectacles with an eyewire distance different from that upon which the tables are based, the following correction has to be made. A correction factor $$\frac{1}{10} \text{ (power in diopters) } (\Delta h \text{ in mm.}) \quad (39)$$

is added to the magnification given in the table for a given meridian for a given spherical and cylindrical correction, the change in eyewire distance, $d$, being reckoned positive for an increase in distance and negative for a decrease in distance.

A spectacle of the type now described is shown in Fig. 20.

*Double toric ocular lenses.*—A further embodiment of visual correction with fit over lenses consists in the duplication in both meridians, of the power and overall magnification of the test lenses in the spectacle lenses. In this instance, the size compensation necessary because of the difference in trial and spectacle lens optics is not taken care of by fit overs, but by the ocular lenses themselves, which have to be designed for the N values described above—compare (33)—, and also take care of the overall size correction. Only the meridional size correction detected during the test is then taken care of by fit over lenses. Generally speaking, an ocular lens of this type is of the double toric type.

A spectacle of this type is shown in Fig. 21.

*Standard ocular lenses.*—It is further possible to correct the dioptric defects with standard lenses, regardless of their magnification properties. The measured eikonic corrections and the compensation for dioptric magnification as well as the compensation for difference of test and spectacle lens characteristics is then taken care of by no power fit over lenses with overall as well as meridional magnification. The various magnification components are found as above explained, combined, and fit over lenses with corresponding magnification properties selected, preferably with the aid of tabulations listing these properties for various steps of distances of the ocular lenses from the eye, which, as above discussed, affect the compensation for difference in test and spectacle lens characteristics.

An example of a table of this type is given in Fig. 22, and a spectacle of this type is shown in Fig. 23. In table Fig. 22, the $D_2$ row will give the necessary ocular surface curve in the toric meridian, and the $D_1$ row the toric front surface curve to be ground on the 3-base. The ocular surface curve in the base-curve meridian is in every case —2.83 diopters. This example gives lenses with zero vergence power at an object distance of 75 cm.

*Fit over lenses.*—The ocular lenses obtained in the above-described manner which correct dioptric and certain size defects have to be combined with proper fit over lenses designed to correct aniseikonia as measured with the trial lens set, without adding any power, and if required to compensate for magnifications of trial or ocular spectacle lenses.

Lenses of this type, that is lenses having a specified magnification but no vergence power can be designed for every particular case according to the method described in Patent No. 1,933,578, of November 7, 1933, to Adelbert Ames, Jr., or, more exactly, in conformity with the present invention, according to Formulas (33) given above, which formulas take into account object distance $p$ and ocular surface distance $h$. According to these formulas $$M = S_o \frac{p-h}{p-h-t+S_o c}$$

$$V_o = \frac{S^2_o}{u+S_o c} - \frac{1}{p-h} = S_o D_1 + D_2$$

These two equations contain three unknowns, $D_1$, $D_2$ and $t$, one of which must be specified.

Arbitrarily selecting the thickness $t$ to be specified for any desired lens, the front and ocular surface powers can be found by solving for $D_1$ and $D_2$, as follows:

$$\left.\begin{array}{l} D_1 = \dfrac{n\dfrac{M-1}{M}(p-h)-(n-1)t}{t(p-h-t)} \\[2ex] D_2 = -\dfrac{n(p-h-t)(M-1)-t(n-1)}{t(p-h)} \end{array}\right\} \quad (40)$$

Values determined according to this relation are preferably laid down, for convenient magnification steps, in tables of which Fig. 24 is an example. It will now be understood that such tables can also be prepared for distant vision where $M = L - D_2 c$ and $D_2 = -S_o D_1$.

If a third condition is imposed upon the functioning of the lens, all three specifications $D_1$, $D_2$ and $t$ are uniquely determined, none being arbitrary. Obviously, not more than three conditions can be imposed. An iseikonic lens can thus be designed to have zero verging power for a given object distance $p$ and for a given ocular surface distance $h$, and having a required angular magnification for all other object distances. The equation stating this condition can be obtained by differentiating equation $M = S_o L P$ with respect to $p$ and equating it to zero. The result is independent of $p$, and the three conditions are $$\left.\begin{array}{l} h(MS_o - 1) - \dfrac{t}{n}(n - S_o) = 0 \\[1ex] M = S_o \dfrac{p-h}{p-h-t-S_o c} \\[1ex] S_o D_1 + D_2 = \dfrac{MS_o - 1}{p-h} \end{array}\right\} \quad (41)$$

The $D_1$, $D_2$ and $t$ values are then uniquely determined for given values of $p$, $h$, and $M$ and can be found from (41).

The thickness will be $$t = \frac{nh(M^2-1)(p-h)}{h(M^2-1)+p(n-M)} \quad (42)$$

$D_1$ and $D_2$ are found from (40).

These fit over lenses being then fastened in front of the lenses for correcting dioptric and overall eikonic defects, at the proper distance from ocular surface to eye, and in the proper eikonic meridian, result in a finished spectacle affording exact correction according to the present invention.

The nature of this phase of my invention will become more clearly comprehensible through the explanation of the practical application thereof with reference to one of the practical examples to be given at the end of this description.

In the special case where the astigmatism is "regular", the astigmatic meridians are in the 180° and 90° axes which are not necessarily, but usually (for physiological and other reasons) also the axes in which meridional size differences are measured. In this instance, the clinician determines the exact trial lenses correcting dioptric and size defects, respectively, and from these data the magnitudes of the differences in size between the images of the two eyes in the instrument. From these values power lenses duplicating the dioptric test lenses, and fit over size lenses duplicating the eikonic test correction, are made and fitted in frames by preserving the ocular lens surface to eye distance.

*Constant eyewire distance fit over spectacles.*—It will be noted that the design of the lenses described above under the heading "Spherical front surface" is based in the constancy of the distance of the ocular lens surface from the eye. As already mentioned, it is also possible to design spectacles of this type with constant distance from the cornea to the eyewires, which is often preferable for the following reasons.

In many cases, the distances from the cornea to the ocular surface will be different for the two eyes, which condition requires either an excessively thick lens for one eye or staggered eyewires which are difficult to fit and to maintain, and also cosmetically unsatisfactory. Further, it is preferable to fit the frames to the patient's face (which requires some latitude in choosing lens distances) instead of maintaining a lens distance determined by the test correction. Eyeglasses of this type and a method to derive them from the trial correction will now be described.

As pointed out above, the design of fit over spectacles as so far discussed, is based on the assumption that the distances $h_e$ and $h_s$ between the eye and the ocular surfaces of corresponding test and spectacle lenses, respectively, are equal, thereby neglecting certain features which are taken into consideration in relations (10) and (13).

For deriving spectacle lenses with distances $h_s$ different from test distance $h_e$, the trial lens ocular surface is to be taken as a center of reference, and for present purposes it is taken to be from 13.75 mm. from the pole of the cornea, although it will be understood that another distance could be selected.

According to relations (10) and (13), the correct magnification of any lens which is displaced a distance $\Delta h$, is, for distant vision.

$$\left.\begin{array}{l} M = S_o(1+V_o\Delta h) \\ \text{where} \quad \dfrac{1}{S_o} = 1 - D_1 c \\ \text{and} \quad V_o = S_o D_1 + D_2 \end{array}\right\} \quad (43)$$

is the vertex power of the lens.

By comparing this magnification with that indicated during the test, and compensating by means of the no power fit over lenses, satisfactory spectacles can be obtained.

This method of correction by deriving eyeglasses with constant eyewire distance (and therefore varying ocular surface distance) from specifications of lenses having the ocular surface distance of the trial lenses involves considerable work if each spectacle, of optimum usefulness under the circumstances, is developed by trial and error. I propose, therefore, a new method of correcting ocular defects, which, with the spectacles made accordingly, constitutes one phase of the present invention. According to this method, I tabulate for various practical lens forms the difference in S magnifications of the spectacle lens and the trial correction, respectively, taking into account all deviations between these two values as follows:

Formula (36) can be written:

$$\left[\dfrac{M_1}{M_2}\right] \cdot \left[\dfrac{(S_o T)_2}{(S_o T)_1}\right] = R$$

By introducing $$S'_2 = \dfrac{M_2}{(S_o T)_2} \text{ and } S'_1 = \dfrac{M_1}{(S_o T)_1} \quad (44)$$

the eikonic ratio R can be expressed by $$\dfrac{S'_1}{S'_2} = R \quad (45)$$

Thus, by defining $S'$ according to (44) and using it in tables, the problem presented by the excess magnification values $S_o T$ of the cylindrical trial lenses is avoided. As an example, the first-mentioned type of fit over spectacles, with spherical front surfaces, will be considered.

A table made up accordingly is shown in Fig. 25. This table applies to the plus 1.50 diopter trial sphere in cells LDS and RDS (Fig. 1) and contains in the left-hand column various $D_1$ and $t$ (front surface curvature and lens thickness) values for spectacle lenses of 12 mm. eyewire distance, giving this dioptric correction. The right-hand columns give the magnification differences $S'$ above described, and the $D_2$ ocular surface curvature values for various astigmatic corrections. Thus, if there is only a spherical correction, a lens with $D_1 = +9.82$, $D_2 = -8.50$ and $t=3.03$ would give a $S'$ magnification of 2.00%. If combined with a cylinder trial lens, for example one of $-1.00D$, the cylinder meridian is indicated as having a $D_2 = -9.50$ with a $S'$ magnification of 2.35%. In other words, the selected spectacle lens has in these two meridians magnifications 2.00% and 2.35%, respectively, larger than the magnification of the dioptric trial lenses. These have to be compensated with the aid of the fit over lenses which also furnish the meridional magnification of the no power trial lenses LEM, REM (Fig. 1), as above explained. For practical purposes, these tables are made up for trial lenses in steps of approximately 0.25D and for $D_1$ values likewise in steps of about 0.25D, Fig. 25 being abbreviated for obvious reasons.

Generally speaking, the lens for one eye is arbitrarily selected from the tables and then the other lens is found whose overall $S'$ magnification will correct the overall size defect measured during the test, care being taken especially to keep the front surface power in the neighborhood of +6.00D in order to obtain favorable field properties, to keep the $S'$ magnification low and to avoid too small a lens thickness. After both lenses have been selected, the meridional size difference and the residual $S'$ values are corrected by means of fit over lenses selected as above described with reference to Fig. 25.

In computing these tables, it is preferable to select certain surfaces of existing lens blanks. For example, the tables of which Fig. 25 is an example have been based on toric ocular surfaces that can be ground with now existing tools.

Instead, similar tables can be, and indeed have been, computed which are based on spherical front surface powers of base curves of an existing lens system. Fig. 26 is an example of a chart of this type, and is designed to make the front spherical surface powers the base curves occurring in the so-called "Tillyer series" lenses, that is in steps of 4.38, 5.38, 6.37, 7.34, 8.78, 9.71, 11.10, 12.00 diopters For reasons previously discussed, these tables are directly applicable only when during the actual test only negative trial case cylinders are used for the correction of astigmatism.

It will be understood that these tables can be prepared for eyewire distances other than 12 mm., and that any set of tables can be used for a different distance by correcting the magnification data obtained for the changed distance according to Formula (39).

If no spherical power is needed, the zero effective power trial lens must be used in the first cell, since otherwise the magnification and power relations become slightly incorrect, for reasons previously discussed herein. Tables may be made to take care of this circumstance without actually using this zero power sphere.

Single eyewire iseikonic spectacles

Spectacle lenses of this type include both overall and meridional size correction in a single lens element. As pointed out above, such lenses will generally be double toric with inclined axes of symmetry. At the present state of the art of lens manufacture, such lenses are preferably made up as two single torics either with cemented inner spherical surface or with air separated inner surfaces, for example according to Patents Nos. 1,948,636, of February 27, 1934, and 1,952,394, of March 27, 1934, both to Edgar D. Tillyer.

Generally speaking, one surface (usually the front surface) or set of surfaces for each spectacle lens is computed to provide in the eikonic meridians magnifications $(S_oL)_1$ and $(S_oL)_2$ according to relation (33). These are magnifications independent of the remaining surface or surfaces, and provide a magnification ratio exactly corresponding to the measured ocular image size difference, modified by the spurious magnifications of the trial lenses. The remaining surface (or surfaces) are then determined as above described, in order to provide dioptric correction according to condition (18).

For distant vision, factor L becomes unity, and only $S_o$ need be considered. Fig. 27 is an example of tables presenting in top row and left column, for distant vision, the $(S_o-1)\%$ magnification values in two meridians, respectively, of a given toric lens blank for the thickness shown at the top of the column for each table. Fig. 28 is an example of a similar table for near vision. It will be understood that for each base curve a separate table is provided and that Figs. 27 and 28 are parts of sets including tables for various base curves.

Thus, for example, if in one meridian an $S'=0.50$ and in the other an $S''=0.75$ is required, a lens blank No. II of thickness 2.06 would be selected for distant vision from Fig. 27.

Having selected the lens blank, the two surface curvatures for the ocular toric are determined according to the following relations, compare (24) to (27):

Distant vision:
$$D_2' = V_e' - D_1' - e'$$
$$D_2'' = V_e'' - D_1'' - e''$$

Near vision:
$$D_2' = V_e' - D_1' - g'$$
$$D_2'' = V_e'' - D_1'' - g''$$

As previously mentioned, the spectacle lens design according to the present invention is especially useful in the frequently occurring cases where principal and eikonic meridians do not coincide. This condition is schematically illustrated in Figs. 29, 29a and 29b. In these figures, H represents the horizontal eikonic meridians and VL and VR the vertical eikonic meridians, whereas PL and PR signify the principal meridians for the left and right eye, respectively. 21 is a conventional frame with eyewires 22 and 24, and l and r are the lenses in front of left and right eye, respectively, secured in the frame in proper alignment with the eyes. The front surfaces,—for example I and II of the lens sections shown in Figs. 29a and 29b—are computed to have in meridians H, VL and VR the curvatures providing the specified test magnification, compensated for various errors as above described. Hence, the meridians of symmetry of torics I and II are located as indicated at H, VL and VR. The ocular surfaces 4 and 14, respectively, are ground to provide the vergence power derived from the test, likewise taking into account the compensations provided by my new method as above described. Therefore, the meridians of symmetry of torics 4 and 14 are located as shown at DL and DR, at angles to meridians of symmetry H, VL and VR of the anterior torics, as indicated by the arrows connecting Fig. 29 with Figs. 29a and 29b.

As mentioned above, double toric lenses with oblique axes can not be economically ground with the optical tools now in existence, and therefore lenses of this type are made as doublets either with spherical and cemented inner surfaces as at 23 of l of Fig. 29, or with an interior air lens as indicated at 12 and 13 of r. It will be evident that instead of aligning the axes of both toric surfaces as described in the above-mentioned patents, these axes must be set and secured at the proper inclinations corresponding to principal and eikonic meridians.

Examples

In order to facilitate the understanding of the above-described invention still further, examples of the design of eikonic spectacles starting with the test record and ending with the finished spectacle, will be given for several especially significant instances.

(1) SPECTACLES WITH FIT OVER LENSES (a) *Spherical front surfaces of ocular lens elements, distant vision*

Clinical record

*Distance 20 ft.*

| Power | Right eye | Left eye |
|---|---|---|
| Sphere | +1.50 | +1.75 |
| Cylinder | −0.50 x 90 | −1.00 x 90 |
| Size | Right eye | Left eye |
| Overall | | 1.0% |
| Meridional | | 1.0% x 90 |

Procedure

With the aid of Fig. 11, the spurious magnifications are determined for each cylinder as follows:

| | Right | Left |
|---|---|---|
| Power meridian | −0.16% | −0.34% |
| Axis meridian (zero for distant vision) | 0.00 | 0.00 |

Equations (36) and (37) can then be written:

$$\left[\frac{S_{o1}}{S_{o2}}\right]_e = 1.02 \frac{1-0.0034}{1-0.0016} = 1.01816 \quad (36)$$

which means that $S_1$ must be greater than $S_R$ by 1.816% (with sufficient approximation 1.82%).

$$\left[\frac{S_{o1}}{S_{o1}}\right]_e = 1.01 \quad (37)$$

$S_1$ must be greater than $S_2$ by 1%.

Since an overall eikonic difference is to be added to the left lens, the right eye lens is first selected as follows:

$$(S_o-1)\% = 0.50\%$$
$$t = 1.93 \text{ mm.}$$

Power meridian:
$$D_2 = -3.00 \text{ diopters}$$

Axis meridian:

$$D_2 = -2.50 \text{ diopters}$$
$$V_o - D_2 = 4.00 \text{ diopters}$$
$$g = 0.01 \text{ diopter}$$
$$D_1 = 3.99 \text{ diopters}$$

The left eye lens is then selected:

$$(S_o - 1)\% = 0.50\% + 1.00\% = 1.50\%$$

With the aid of the charts:

$$(S_o - 1)\% = 1.50\%$$
$$t = 2.73 \text{ mm.}$$

Power meridian:

$$D_2 = -8.00 \text{ diopters}$$

Axis meridian:

$$D_2 = -7.00 \text{ diopters}$$
$$V_o - D^2 = 8.75 \text{ diopters}$$
$$g = 0.15 \text{ diopter}$$
$$D_1 = 8.60 \text{ diopters}$$

A fit over lens of $1.82\% - 1.00\% = 0.82\%$ must be added to the left eye, providing eikonic as well as spurious meridional magnification.

These spectacles will have different distances of optical surfaces from the eyes, the eyewires being staggered about 1.3 mm. The eyewire distances could be made equal as above described.

(b) *Same, near vision*

Clinical record

| Power | Right eye | Left eye |
|---|---|---|
| Sphere | -2.00 | -2.50 |
| Cylinder | -1.00 x 180 | -0.50 x 90. |
| Size | | |
| Overall | | 1.50%. |
| Meridional | 0.50% | |

Procedure

With the aid of Fig. 12, the spurious cylinder magnifications are determined:

|  | Right | Left |
|---|---|---|
| Power meridian | 1.24% | 0.12% |
| Axis meridian | -0.05% | 1.24% |

Equations (34) and (35) are now applied:

$$\left[\frac{(S_oL)_1}{(S_oL)_2}\right]_s = 1.0162 \frac{1+0.0012}{1+0.0124} = 1.005 \quad (34)$$

$$\left[\frac{(S_oL)_1}{(S_oL)_2}\right]_s = 1.010 \frac{1+0.0124}{1+0.0005} = 1.023 \quad (35)$$

With the aid of Figs. 5, 8 and 9, the right eye lens is first selected as follows:

$$(S_o-1)\% = 0.75\%$$
$$t = 1.54 \text{ mm.}$$
$$D_1 = 6.00$$

Power meridian:

$$V_e = -2.00 \text{ diopters}$$
$$r = 0.00 \text{ diopter}$$
$$V_o = -2.00 \text{ diopters}$$
$$g = 0.04 \text{ diopter}$$
$$D_2 = -8.04 \text{ diopters}$$

Axis meridian:

$$V_e = -3.00 \text{ diopters}$$
$$r = -.18 \text{ diopter}$$
$$V_o = -2.82 \text{ diopters}$$
$$g = 0.04 \text{ diopter}$$
$$D_2 = -8.82 \text{ diopters}$$

The left eye lens is then selected:

$$(S_o-1)\% = 1.25\%$$
$$t = 2.00$$

Power meridian:

$$V_e = -3.00 \text{ diopters}$$
$$r = -0.09 \text{ diopter}$$
$$V_o = -2.91 \text{ diopters}$$
$$g = 0.06 \text{ diopter}$$
$$D_2 = -10.97 \text{ diopters}$$

Axis meridian:

$$V_e = -2.50 \text{ diopters}$$
$$r = 0.00 \text{ diopter}$$
$$V_o = -2.50 \text{ diopters}$$
$$g = 0.06 \text{ diopter}$$
$$D_2 = -10.56 \text{ diopters}$$

A fit over lens of 1.8% magnification in the 180° axis is added to the left eye lens. With the above values, the eyewires will be staggered 0.6 mm.

(c) *Spherical ocular surfaces of ocular lens elements*

Clinical record

| Power | Right eye | Left eye |
|---|---|---|
| Sphere | +2.00 | +2.25. |
| Cylinder | -0.75 x 90 | -1.25 x 90. |
| Size | | |
| Overall | | 1.0%. |
| Meridional | | 1.0% x 90. |

By using the chart Fig. 19, the following prescription is directly obtained.

Right eye lens:

$$t = 2.35 \text{ mm.}$$
$$D_1 = 4.382 \text{ and } 5.127 \text{ diopters}$$
$$S' = 0.50; D_2 = -3.25 \text{ in axis meridian}$$
$$S' = 0.77 \quad \text{in power meridian}$$

Left eye lens:

$$t = 2.70 \text{ mm.}$$
$$D_1 = 7.326 \text{ and } 8.548 \text{ mm.}$$
$$S' = 1.50; D_2 = -6.50 \text{ in axis meridian}$$
$$S' = 1.73 \quad \text{in power meridian}$$

Fit over:

$$2.00 - (1.73 - 0.77) = 1.04\%$$

before the left eye in the 90° meridian.

(2) SINGLE EYEWIRE SPECTACLES

Clinical record

*Distant vision*

| Power | Right eye | Left eye |
|---|---|---|
| Sphere | +2.00 | +2.25. |
| Cylinder | -0.75 x 90 | -1.25 x 90°. |
| Size | Right eye | Left eye |
| Overall | | 1.00%. |
| Meridional | | 1.00% x 90°. |

Preliminary consideration shows that by following the course indicated in the previous examples, spherical front surfaces would require toric ocular surfaces which can not readily be obtained. Hence, the meridional magnification is re-distributed as follows:

|  | Right eye | | Left eye | |
|---|---|---|---|---|
|  | 180° | 90° | 100° | 90° |
| S' | 0.75% | 1.00% | 2.56% | 2.00% |

Reference to Fig. 25 shows that the prescription can be filled as follows:

|  | Right eye | | Left eye | |
|---|---|---|---|---|
|  | 180° | 90° | 180° | 90° |
| $D_1$ | 4.38 | 5.87 | 11.48 | 8.78 |
| $D_2$ | 3.25 | −4.00 | −10.87 | −6.75 |
| t | 2.58 mm. | | 3.38 mm. | |

These spectacles may be manufactured in various ways for example as cemented toric lenses as indicated in Fig. 29, I, as follows:

Right eye

| | | | |
|---|---|---|---|
| Lens farthest from eye | Anterior surface | Tillyer lens blank | FV45150 base curve in 180° meridian |
| | Thickness | 1.35 mm. | |
| | Ocular surface | −4.50 sphere. | |
| Lens nearest eye | Anterior surface | +4.50 sphere. | |
| | Thickness | 1.23 mm. | |
| | Ocular surface | −3.25 (.05w)  −4.00 (.02w) axis 180. | |

Left eye

| | | | |
|---|---|---|---|
| Lens farthest from eye | Anterior surface | Tillyer lens blank | FV9287 base curve in 180° meridian |
| | Thickness | 2.00 mm. | |
| | Ocular surface | −8.50 sphere. | |
| Lens nearest eye | Anterior surface | +8.50 sphere. | |
| | Thickness | 1.40 mm. | |
| | Ocular surface | −6.75 (.04w)  −10.87 (.04w) axis 180. | |

*Eyewire distances*

Right eyewire=12.4 mm. from pole of cornea.
Left eyewire=12.2 mm. from pole of cornea.
Staggering=0.2 mm.

I claim:

1. The method of correcting binocular vision for an approximately selected object distance, which comprises measuring ametropia of both eyes including astigmatism with trial lens sets including spaced spherical elements and cylindrical elements additively indicating power for infinite object distance, with their ocular surfaces at a fixed distance from the respective eyes; measuring the ratio of remaining incongruities in the eikonic meridians of the respective ocular images; making spectacle lenses for the respective eyes by forming optical magnification surfaces on lens medium being spaced from the other surfaces by given lens thicknesses and each surface having in a certain meridian curvatures computed according to the distances from the respective eyes at which the lenses are to be worn, to effect in said certain meridians a spectacle magnification ratio substantially equal to said measured ratio, combined with the ratios of magnifications of said sets as indicated for infinite object distance, of magnification variations due to said selected object distance, and of magnification variations due to the positions of said elements of said trial sets relatively to the respective eyes, and by forming optical power surfaces, spaced from said magnification elements by said thicknesses, effecting in selected meridians spectacle vergence powers equal to the sum of said indicated powers corrected for said selected object distance and predetermined distances from the respective eyes of the ocular spectacle lens surfaces different from said fixed distance; and positioning said spectacle lenses before their respective eyes at said predetermined distances, with the meridians of said magnification surfaces substantially coinciding with said eikonic meridians and the meridians of said power surfaces placed to provide in the astigmatic meridians said spectacle vergence powers.

2. The method of correcting binocular vision for an approximately selected finite object distance, which comprises measuring ametropia of both eyes including astigmatism with trial lens sets including spherical elements and cylindrical elements additively indicating powers for infinite object distance; measuring the ratio of remaining incongruities in the eikonic meridians of the respective ocular images; making spectacle lenses for the respective eyes by forming optical magnification surfaces on lens medium being spaced from the other surfaces by given lens thicknesses and each surface having in a certain meridian curvatures computed according to the distances from the respective eyes at which the lenses are to be worn, to effect in said certain meridians a spectacle magnification ratio for said object distance substantially equal to said measured ratio combined with the ratios of magnifications of said sets as indicated for infinite object distance, and of magnification variations due to said finite object distance and by forming optical power surfaces, spaced from said magnification elements by said thicknesses, effecting in selected meridians spectacle vergence powers for said object distance, substantially equal to the sum of said indicated powers corrected for said object distance; and positioning said spectacle lenses before their respective eyes, with the meridians of said magnification surfaces substantially coinciding with said eikonic meridians and the meridians of said power surfaces placed to provide in the astigmatic meridians said spectacle vergence powers.

3. The method of correcting binocular vision, which comprises measuring ametropia of both eyes including astigmatism with trial lens sets including spaced spherical elements and cylindrical elements; measuring the ratio of remaining incongruities in the eikonic meridians of the respective ocular images; making spectacle lenses for the respective eyes by forming optical magnification surfaces on lens medium being spaced from the other surfaces by given lens thicknesses and each surface having in a certain meridian curvatures computed according to the distances from the respective eyes at which the lenses are to be worn, to effect in said certain meridians a spectacle magnification ratio substantially equal to said measured ratio combined with the ratio of magnifications of said sets corrected for magnification variations due to said spacing of said elements of said trial sets, and by forming optical power surfaces, spaced from said magnification elements by said thicknesses, effecting in selected meridians spectacle vergence powers substantially equal to the powers of said trial sets substantially corrected for said spacing of said trial set elements; and positioning said spectacle lenses before their respective eyes with the meridians of said magnification surfaces substantially coinciding with said eikonic meridians and the meridians of said power surfaces placed to provide in the astigmatic meridians said spectacle vergence powers.

4. The method of correcting ametropia including astigmatism and overall and meridional aniseikonia, which comprises substantially correcting for an approximately selected object distance the dioptric defects with test lens sets having spherical and cylindrical elements spaced at certain separations whose ocular surfaces are placed at a certain distance from the respective eyes and which indicate additively a certain power at infinite object distance, the meridians of said cylindrical elements coinciding with the principal meridians of the respective eyes; substantially correcting the remaining aniseikonia with substantially no power test lenses indicating for corresponding eikonic meridians a magnification ratio R; making spectacle lenses for predetermined distances of their ocular surfaces from their respective eyes having in one pair of meridians said vergence power of said test lens sets corrected by a factor allowing for said selected object distance and for a difference in said distances of ocular surfaces from respective eyes, and having in a second pair of meridians for the right and left eye, respectively, magnifications $M_1$ and $M_2$ conforming to the relation $$\frac{M_1}{M_2} = \left[\frac{(S_oLP')_1}{(S_oLP')_2}\right]_s = R\left[\frac{(S_{of}TL)_1}{(S_{of}TL)_2}\right]_e$$

where subscripts $s$ and $e$ refer to spectacles and test lenses respectively, $S_o$ and $S_{of}$ are defined by one set of surfaces and by the thickness of spectacle and trial lenses respectively, $L$ by the ocular surface distances of spectacle and test lenses, $T$ by said separations and $P'$ by said vergence powers corrected for said differences; said magnifications being effected in said first pair of meridians by said set of surfaces of said spectacle lenses and their thicknesses, and said vergence powers being determined in said second pair of meridians by a second set of surfaces of said spectacle lenses; and placing said spectacle lenses before the respective eyes with said first set of meridians substantially coinciding with said eikonic meridians, and with said second set of meridians located to correct said astigmatism in substantially said principal meridians.

5. The method of correcting ametropia including astigmatism and overall and meridional aniseikonia, which comprises substantially correcting the dioptric defects with test lens sets having spherical and cylindrical elements spaced at certain separations additively indicating a certain power, the meridians of said cylindrical elements coinciding with the principal meridians of the respective eyes; substantially correcting the remaining aniseikonia with substantially no power test lenses indicating for corresponding eikonic meridians a magnification ratio R; making spectacle lenses having in selected meridians substantially said vergence power of said test lens sets, and having in selected meridians of respective eyes magnifications $M_1$ and $M_2$ conforming to the relation $$\frac{M_1}{M_2} = \left[\frac{(S_o)_1}{(S_o)_2}\right]_s = R\left[\frac{(S_{of}T)_1}{(S_{of}T)_2}\right]_e$$

where $S_o$ is defined by certain magnification surfaces and the thicknesses of said spectacle lenses, $S_{of}$ by one set of surfaces and by the thicknesses of said cylindrical elements and $T$ by said separations; said magnifications being effected by said set of surfaces and said thicknesses of said spectacle lenses, and said vergence powers being determined by a second set of surfaces thereof; and placing said spectacle lenses before the respective eyes with said selected meridians substantially located to correct said astigmatism and said meridional aniseikonia.

6. The method of correcting ametropia including astigmatism and overall and meridional aniseikonia, which comprises substantially correcting a finite object distance the dioptric defects with test lens sets having spherical and cylindrical elements indicating a certain power at infinite object distance, the meridians of said cylindrical elements coinciding with the principal meridians of the respective eyes; substantially correcting the remaining aniseikonia with substantially no power lenses indicating for corresponding eikonic meridians a magnification ratio R; making spectacle lenses having in selected meridians said vergence power of said test lens sets corrected by a factor allowing for said finite object distance, and having in selected meridians magnifications $M_1$ and $M_2$ conforming to the relation $$\frac{M_1}{M_2} = \left[\frac{(S_oL)_1}{(S_oL)_2}\right]_s = \left[\frac{(S_{of}L)_1}{(S_{of}L)_2}\right]_e$$

where $S_o$ is defined by certain magnification surfaces and the thicknesses of said spectacle lenses, $S_{of}$ by surfaces and thicknesses of said cylindrical elements and $L$ by said ocular surface distances, said magnifications being effected by said magnification surfaces and said thicknesses of said spectacle lenses and said vergence powers being determined by power surfaces; and placing said spectacle lenses before the respective eyes with said selected meridians substantially located to correct said astigmatism and said meridional aniseikonia.

7. Spectacles for correcting dioptric and eikonic defects of a pair of eyes, the eikonic defects having been measured with test lenses determining an eikonic magnification ratio and the dioptric defects having been measured with dioptric trial lenses having spherical and cylindrical lens elements placed at a certain separation at a certain test distance from the respective eyes, accommodated for a certain object distance, and additively indicating powers for an object distance corresponding to distant vision, comprising a spectacle frame; and a pair of lens units, one for each eye, having for each eye lens mediums of given indices of refraction, thicknesses and distances from the respective eyes and one set of optical lens surfaces which combined together for said medium will produce, in selected eikonic meridians, with said thicknesses, and for said distances from the respective eyes, a magnification ratio substantially equal to said eikonic magnification ratio multiplied by the ratio of the shape magnifications of said dioptric trial lenses by the ratio of the magnifications effected by the difference of said certain object distance from said infinite distance and by the ratio of the magnifications effected by said dioptric trial lenses due to said separation, and said units having another set of optical surfaces placed at said thicknesses from said first surfaces and providing with said first set of surfaces in meridians corresponding to the principal meridians of said cylinder lenses vergence powers substantially equal to said powers indicated by said trial sets to which are algebraically added the power differences due to said certain object distance and differences between said test and said spectacle distances; said lens units being placed in said frame at said spectacle distances and with the meridians of symmetry of said first and second set of surfaces in position to effect said magnification ratios and said vergence powers in said eikonic and principal meridians respectively.

8. Spectacles for correcting dioptric and eikonic defects of a pair of eyes, the eikonic defects having been measured with test lenses determining an eikonic magnification ratio and the dioptric defects having been measured with dioptric trial lenses having spherical and cylindrical lens elements placed at a certain separation at a certain test distance from the respective eyes looking therethrough at an object at a certain finite distance and additively indicating powers for infinite object distance, comprising a spectacle frame; and a pair of lens units, one for each eye, having for each eye lens mediums of given indices of refraction thicknesses and distances from the respective eyes and one set of optical lens surfaces which combined together for said medium will produce, with said thickness of said units in selected eikonic meridians a magnification ratio substantially equal to said eikonic magnification ratio multiplied by the ratio of the shape magnifications of said dioptric trial lens sets, and multiplied by the ratio of the magnifications effected by the difference of said finite object distance from said infinite distance, and said units having another set of optical surfaces placed at said thicknesses from said first surfaces and providing with said first set of surfaces in meridians corresponding to the principal meridians of said trial sets lenses vergence powers substantially equal to said powers indicated by said trial sets, said lens units being placed in said frames with the meridians of symmetry of said first and second sets of surfaces in position to effect said magnification ratios and said vergence powers in said eikonic and principal meridians respectively.

9. Spectacles for correcting dioptric and eikonic defects of a pair of eyes, the eikonic defects having been measured with test lenses determining an eikonic magnification ratio and the dioptric defects having been measured with dioptric trial lenses having spherical and cylindrical lens elements placed at a certain separation at a certain test distance from the respective eyes, accommodated for a certain object distance and additively indicating powers for an object distance corresponding to distant vision, comprising a spectacle frame; and a pair of lens units, one for each eye, having for each eye lens mediums of given indices of refraction, thicknesses and distances from the respective eyes and one set of optical lens surfaces which combined together for said medium will produce, with said thickness of said units, in selected eikonic meridians, said magnification ratio multiplied by the ratio of the shape magnifications of said dioptric trial lenses with said spherical and cylindrical lens elements placed at said certain separation before the respective eyes, multiplied by the ratio of the magnifications effected by said trial sets due to said separation, and said units having another set of surfaces placed at said thicknesses from said first surfaces and providing with said first set of surfaces in meridians corresponding to the principal meridians of said cylinder lenses vergence powers substantially equal to said powers indicated by said trial sets, said lens units being placed in said frames with the meridians of symmetry of said first and second sets of surfaces in position to effect said magnification ratios and said vergence powers in said eikonic and principal meridians respectively.

10. Spectacles for correcting dioptric defects including astigmatism in certain principal meridians and for compensating meridional aniseikonia, the principal and eikonic meridians being inclined to each other, the aniseikonia having been measured with test lenses determining an eikonic magnification ratio and the dioptric defects having been measured with dioptric trial lenses having spherical and cylindrical lens elements placed at a certain separation at a certain test distance from the respective eyes, accommodated for a certain object distance, and additively indicating powers for an object distance corresponding to distant vision, and indicating in said principal meridians powers V, comprising a spectacle frame; and a pair of lens units, one for each eye, having for each eye lens mediums of given indices of refraction, thicknesses, distances from the respective eye, and surface curvatures correlated with the lenses of the eyes together to produce ocular images of substantial congruity by providing in said eikonic meridians said magnification ratios and substantially to compensate said dioptric defects by supplying said powers V in said principal meridians; the magnifications M of said lenses being computed according to the relation $$M = \frac{1}{1-hV} \frac{1}{1-tD_1}$$

having a difference of front curvatures $D_1$ in selected meridians and of thicknesses $t$ corresponding to said aniseikonia when using only the lenses of the eyes, said difference providing said ratios; the ocular surfaces of said lenses having in certain meridians curvatures providing with the corresponding front surface curvatures said powers V and said lenses being mounted in said frames at ocular distances $h$ and with the meridians of symmetry of said front and ocular surfaces at angles relating them to said eikonic and principal meridians to provide said ratios and said powers respectively.

11. Spectacles according to claim 10 having different distances $h$ for the respective eyes; said distances providing substantially equal distances from the eyes of the edges of said lenses.

12. Spectacles according to claim 10 with the axes of symmetry of said front surfaces being vertical and horizontal for both eyes.

13. Spectacles for correcting meridional eikonic and astigmatic defects with the eikonic meridians inclined to the principal astigmatic meridians of a respective eye, said spectacles including a frame, and two lens units distanced in said frame relatively to the respective eyes, each unit comprising two lens surface means, one surface means being curved symmetrically to planes located by said frames substantially to coincide with said eikonic meridians and having distances from the second surface means to effect, at given distances from the respective eyes as determined by said frames, in said eikonic meridians given ratios of magnifications of the ocular images of the respective eyes, and the second surface means of at least one unit being curved symmetrically to a plane located by said frame relatively to said principal meridian for the respective eye to effect, with said distances and the curvatures of said other surface means, in one of said principal meridians a given power and in a meridian normal thereto a substantially different power, said normal meridians being inclined to the eikonic meridians of the respective eye.

14. Spectacles for correcting eikonic and astigmatic defects, said spectacles including a frame and two lens units each having a bevel set in the eye wires of said frames for equally distancing said bevels in said frame relatively to the respective eyes, the lens units having different thicknesses and each lens unit comprising two surface means, one surface means of each lens unit being curved to effect with the respective thicknesses and distances from the respective eyes, in given meridians, given ratios of magnifications of the ocular images of the respective eyes, the second surface means being curved to effect predetermined powers, said bevels being by said frames substantially equally spaced from the respective eyes, and the second surface means of one of said lens units being placed at a certain distance from its eye and the second surface means of the other lens unit being placed at a distance from its eye substantially different from said distance for the first lens unit.

15. The method of correcting binocular vision which comprises measuring ametropia, including astigmatism, of the respective eyes with trial power lens sets, measuring the ratio of remaining ocular image incongruities including overall as well as meridional aniseikonia, making spectacle lenses correcting dioptric and overall eikonic defects, including overall magnification effects due to said trial sets, placing said lenses before the eyes with the meridians of cylindrical surfaces in correspondence with the eikonic and principal meridians of the respective eyes, making a no power lens system providing correction of measured meridional eikonic defects, and fitting said no power lens system in optical alignment over said spectacle lenses.

16. The method of correcting binocular vision which comprises measuring ametropia, including astigmatism, of the respective eyes with trial power lens sets, measuring the ratio of remaining ocular image incongruities including overall as well as meridional aniseikonia, making spectacle lenses correcting dioptric and overall eikonic defects, including the overall and meridional magnification effects due to said trial sets, placing said lenses before the eyes with the meridians of cylindrical surfaces in correspondence with the eikonic and principal meridians of the respective eyes, making a no power lens system providing correction of measured meridional eikonic defects, and fitting said no power lens system in optical alignment over said spectacle lenses.

17. The method of correcting binocular vision which comprises measuring ametropia, including astigmatism, of the respective eyes with trial power lens sets, measuring the ratio of remaining ocular image incongruities including overall as well as meridional aniseikonia, making spectacle lenses correcting dioptric and overall eikonic defects including the overall magnification effects due to said trial sets, placing said lenses before the eyes with the meridians of cylindrical surfaces in correspondence with the eikonic and principal meridians of the respective eyes, making a no power lens system providing correction of measured meridional eikonic defects, and compensation of meridional eikonic incongruities due to said trial lenses and fitting said no power lens system in optical alignment over said spectacle lenses.

18. Spectacles for correcting overall and meridional eikonic defects and ametropia including astigmatism, said overall defects being defined by the ratios of overall eikonic test lens magnifications and of undesired overall dioptric trial lens magnifications, and said meridional defects being defined by the ratios of meridional eikonic test lens magnifications and of undesired meridional dioptric trial lens magnifications, said spectacles comprising frames; mounted in said frames a pair of lens means, one for each eye, having for each eye lens mediums of given indexes of refraction, thicknesses, separations from the respective eyes, and optical lens surfaces computed to effect in at least two meridians parallel in respective units, ratios of magnification conforming to the said overall eikonic test lens magnification ratio combined with said overall dioptric trial lens magnification ratio; and fitted in said frames in front of said first mentioned lens means, auxiliary lens means having lens medium of given index of refraction, thickness, separations from said eye and optical lens surfaces computed to effect in one meridian a magnification ratio conforming to said meridional eikonic test lens magnification ratio, the said lens means being optically aligned to effect magnification ratios substantially conforming to said eikonic defect.

19. Spectacles for correcting overall and meridional eikonic defects and ametropia including astigmatism, said overall defects being defined by the ratios of overall eikonic test lens magnifications and of undesired overall dioptric trial lens magnifications, and said meridional defects being defined by the ratios of meridional eikonic test lens magnifications and of undesired meridonal dioptric trial lens magnifications, said spectacles comprising frames; mounted in said frames a pair of lens means, one for each eye, having for each eye lens mediums of given indexes of refraction, thicknesses, separations from the respective eyes, and optical lens surfaces computed to effect in at least two meridians parallel in respective units, ratios of magnification conforming to the said overall eikonic test lens magnification ratio combined with said overall and meridional dioptric trial lens magnification ratios; and fitted in said frames in front of said first mentioned lens means, auxiliary lens means having lens medium of given index of refraction, thickness, separations from said eye and optical lens surfaces computed to effect in one meridian a magnification ratio conforming to said meridional eikonic test lens magnification ratio, the said lens means being optically aligned to effect magnification ratios substantially conforming to said eikonic defect.

20. Spectacles for correcting overall and meridional eikonic defects and ametropia including astigmatism, said overall defects being defined by the ratios of overall eikonic test lens magnifications and of undesired overall dioptric trial lens magnifications, and said meridional defects being defined by the ratios of meridional eikonic test lens magnifications and of undesired meridional dioptric trial lens magnifications, said spectacles comprising frames; mounted in said frames a pair of lens means, one for each eye, having for each eye lens mediums of given indexes of refraction, thicknesses, separations from the respective eyes, and optical lens surfaces computed to effect in at least two meridians parallel in respective units, ratios of magnification conforming to the said overall eikonic test lens magnification ratio combined with said overall dioptric trial lens magnification ratio; and fitted in said frames in front of said first mentioned lens means, auxiliary lens means having lens medium of given index of refraction, thickness, separations from said eye and optical lens surfaces computed to effect in one meridian a magnification ratio conforming to said meridional eikonic test lens magnification ratio combined with said meridional dioptric trial lens magnifications, the said lens means being optically aligned to effect magnification ratios substantially conforming to said eikonic defect.

21. Spectacles for correcting overall and meridional eikonic defects and ametropia including astigmatism, said overall defects being defined by the ratios of overall eikonic test lens magnifications and of undesired overall dioptric trial lens magnifications, and said meridional defects being defined by the ratios of meridional eikonic test lens magnifications and of undesired meridional dioptric trial lens magnifications, said spectacles comprising frames; mounted in said frames a pair of lens means, one for each eye, having for each eye lens mediums of given indexes of refraction, thicknesses, separations from the respective eyes, and optical lens surfaces including spherical ocular surfaces computed to effect in at least two meridians parallel in respective units, ratios of magnification conforming to the said overall eikonic test lens magnification ratio combined with said overall dioptric trial lens magnification ratio; and fitted in said frames in front of said first mentioned lens means, auxiliary lens means having lens medium of given index of refraction, thickness, separations from said eye and optical lens surfaces computed to effect in one meridian a magnification ratio conforming to said meridional test lens magnification ratio, the said lens means being optically aligned to effect magnification ratios substantially conforming to said eikonic defect.

22. Spectacles for correcting overall and meridional eikonic defects and ametropia including astigmatism; said overall defects being defined by the ratios of overall eikonic test lens magnifications and of undesired overall dioptric trial lens magnifications, and said meridional defects being defined by the ratios of meridional eikonic trial lens magnifications and of undesired meridional dioptric test lens magnifications, said spectacles comprising frames; mounted in said frames a pair of lens means, one for each eye, having for each eye lens mediums of given indexes of refraction, thicknesses, separations from the respective eyes, and optical lens surfaces including spherical anterior surfaces computed to effect in at least two meridians parallel in respective units, ratios of magnification conforming to the said overall eikonic test lens magnification ratio combined with said overall dioptric trial lens magnification ratio; and fitted in said frames in front of said first mentioned lens means, auxiliary lens means having lens medium of given index of refraction, thickness, separations from said eye and optical lens surfaces computed to effect in one meridian a magnification ratio conforming to said meridional test lens magnification ratio, the said lens means being optically aligned to effect magnification ratios substantially conforming to said eikonic defect.

KENNETH N. OGLE.